(12) United States Patent
Kagawa et al.

(10) Patent No.: US 7,126,591 B2
(45) Date of Patent: Oct. 24, 2006

(54) IMAGE DISPLAY DEVICE

(75) Inventors: Shuichi Kagawa, Tokyo (JP); Hiroaki Sugiura, Tokyo (JP); Mariko Takahashi, Tokyo (JP); Narihiro Matoba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 239 days.

(21) Appl. No.: 09/909,865

(22) Filed: Jul. 23, 2001

(65) Prior Publication Data

US 2002/0150293 A1  Oct. 17, 2002

(30) Foreign Application Priority Data

Feb. 15, 2001  (JP)  ............................ P2001-038222

(51) Int. Cl.
  *G09G 5/00*  (2006.01)
(52) U.S. Cl. .................. 345/204; 345/591; 348/602; 382/167
(58) Field of Classification Search ................ 345/600, 345/601, 602, 603, 604, 204, 591; 348/661, 348/602, 684, 655, 658, 663; 382/167, 168
  See application file for complete search history.

(56) References Cited

U.S. PATENT DOCUMENTS

| | | | | |
|---|---|---|---|---|
| 5,406,305 A | * | 4/1995 | Shimomura et al. | ........ 345/102 |
| 5,757,438 A | * | 5/1998 | Yoon et al. | .................. 348/603 |
| 5,917,556 A | * | 6/1999 | Katayama | .................... 348/655 |
| 5,956,015 A | * | 9/1999 | Hino | .......................... 345/600 |
| 6,388,648 B1 | * | 5/2002 | Clifton et al. | ................ 345/88 |
| 6,480,202 B1 | * | 11/2002 | Deguchi et al. | ............ 345/600 |

FOREIGN PATENT DOCUMENTS

JP  A6160845  6/1994

* cited by examiner

*Primary Examiner*—Richard Hjerpe
*Assistant Examiner*—Kevin M. Nguyen
(74) *Attorney, Agent, or Firm*—Birch, Stewart, Kolasch & Birch, LLP

(57) ABSTRACT

An image having a large contrast and excellent visibility to the viewer is displayed on an image display device used in the presence of light. A black-display characteristic specifying means generates a black-display characteristic specifying data indicating the brightness of the external light reflected from the surface of an image display means, which is obtained by operating an external-light brightness specifying bar to be displayed on the image display means. A black-approximated data calculating means calculates, based on the black-display characteristic specifying data, a black-approximated data related to at least one of luminance, chromaticity and tristimulus values in displaying black with the image display means. On receipt of an image data and the black-approximated data, a black correction means calculates a black-corrected image data, and displays an image on the image display means based on the black-corrected image data.

42 Claims, 27 Drawing Sheets

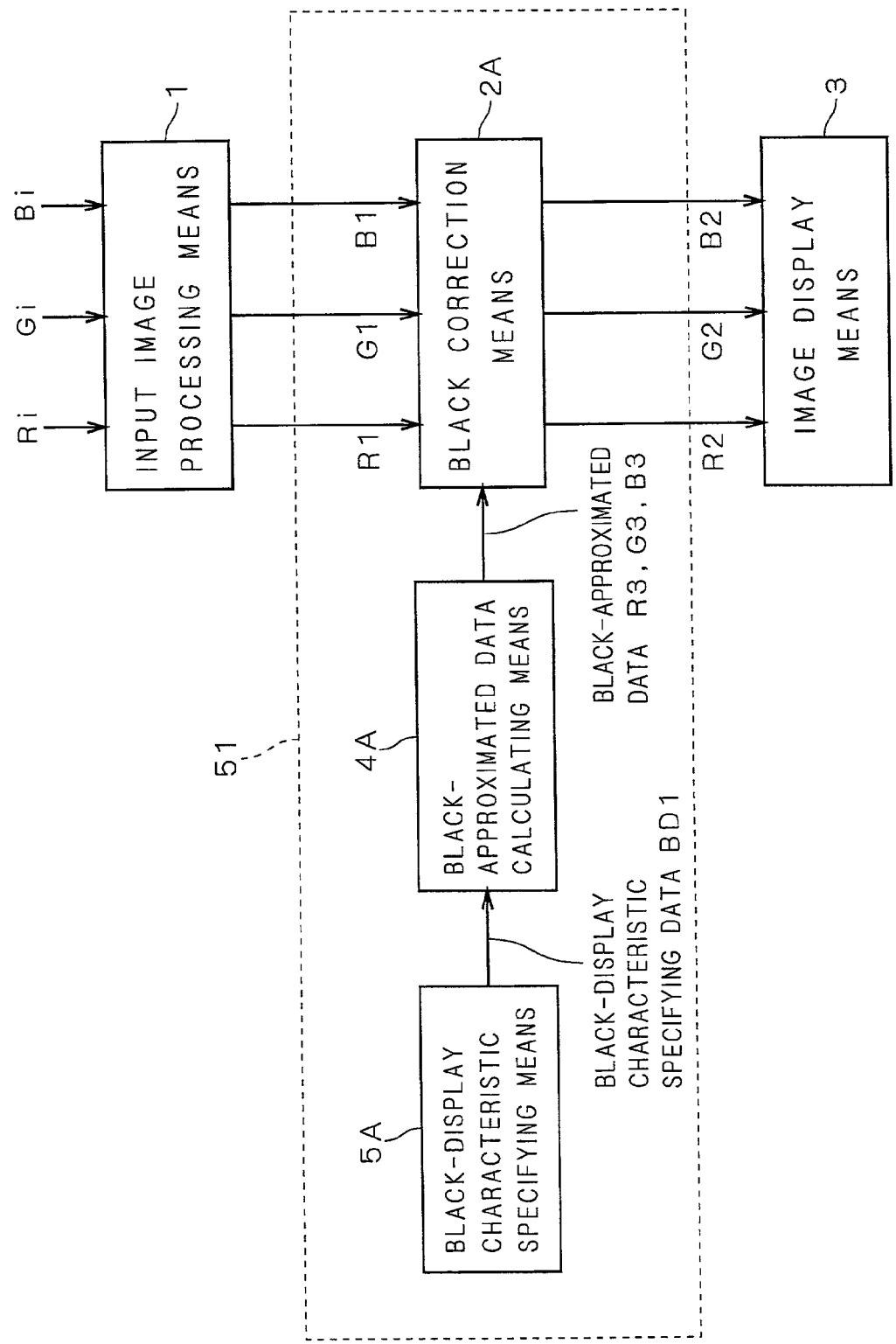
F I G . 1

F I G . 4

| BLACK-DISPLAY CHARACTERISTIC SPECIFYING DATA BD1 (EXTERNAL LIGHT BRIGHTNESS) | SPECIFIED VALUE Ye OF LUMINANCE Y2 OF EXTERNAL LIGHT REFRECTED ($cd/m^2$) |
|---|---|
| 0 | 0 |
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |

FIG. 6

| R1 | G1 | B1 | R2 | G2 | B2 | X3 | Y3 | Z3 | RATIO TO WHITE (Y/Ymax) |
|---|---|---|---|---|---|---|---|---|---|
| 0 | 0 | 0 | 0 | 0 | 0 | 10.505 | 11.000 | 11.890 | 0.109 |
| 10 | 10 | 10 | 0 | 0 | 0 | 10.505 | 11.000 | 11.890 | 0.109 |
| 20 | 20 | 20 | 10 | 10 | 10 | 20.010 | 21.000 | 22.780 | 0.208 |
| 30 | 30 | 30 | 20 | 20 | 20 | 29.515 | 31.000 | 33.670 | 0.307 |
| 40 | 40 | 40 | 30 | 30 | 30 | 39.020 | 41.000 | 44.560 | 0.406 |
| 50 | 50 | 50 | 40 | 40 | 40 | 48.525 | 51.000 | 55.450 | 0.505 |
| 60 | 60 | 60 | 50 | 50 | 50 | 58.030 | 61.000 | 66.340 | 0.604 |
| 70 | 70 | 70 | 60 | 60 | 60 | 67.535 | 71.000 | 77.230 | 0.703 |
| 80 | 80 | 80 | 70 | 70 | 70 | 77.040 | 81.000 | 88.120 | 0.802 |
| 90 | 90 | 90 | 80 | 80 | 80 | 86.545 | 91.000 | 99.010 | 0.901 |
| 100 | 100 | 100 | 90 | 90 | 90 | 96.050 | 101.000 | 109.900 | 1.000 |

FIG. 7

| R1 | G1 | B1 | X3 | Y3 | Z3 | RATIO TO WHITE (Y/Ymax) |
|---|---|---|---|---|---|---|
| 0 | 0 | 0 | 1.000 | 1.000 | 1.000 | 0.010 |
| 10 | 10 | 10 | 10.505 | 11.000 | 11.890 | 0.109 |
| 20 | 20 | 20 | 20.010 | 21.000 | 22.780 | 0.208 |
| 30 | 30 | 30 | 29.515 | 31.000 | 33.670 | 0.307 |
| 40 | 40 | 40 | 39.020 | 41.000 | 44.560 | 0.406 |
| 50 | 50 | 50 | 48.525 | 51.000 | 55.450 | 0.505 |
| 60 | 60 | 60 | 58.030 | 61.000 | 66.340 | 0.604 |
| 70 | 70 | 70 | 67.535 | 71.000 | 77.230 | 0.703 |
| 80 | 80 | 80 | 77.040 | 81.000 | 88.120 | 0.802 |
| 90 | 90 | 90 | 86.545 | 91.000 | 99.010 | 0.901 |
| 100 | 100 | 100 | 96.050 | 101.000 | 109.900 | 1.000 |

——— IMAGE DISPLAY DEVICE OF FIRST PREFERRED EMBODIMENT
(UNDER INFLUENCE OF EXTERNAL LIGHT)

-------- UNDER NO INFLUENCE OF EXTERNAL LIGHT

—·—·— CONVENTIONAL IMAGE DISPLAY DEVICE
(UNDER INFLUENCE OF EXTERNAL LIGHT)

F I G . 10
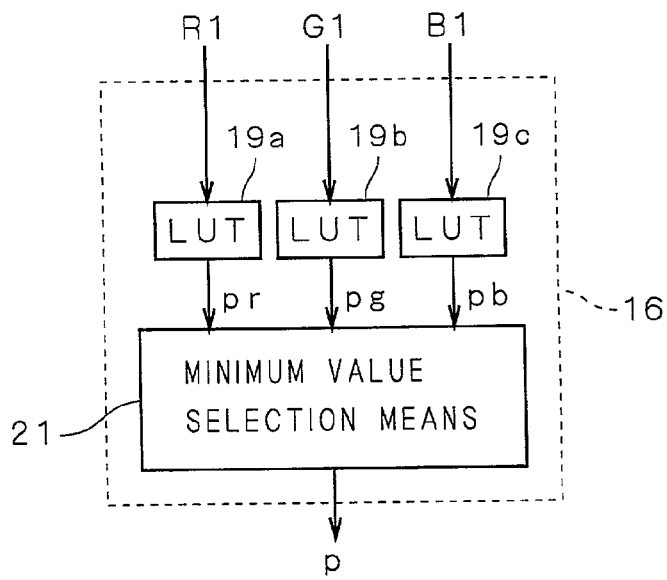
F I G . 11
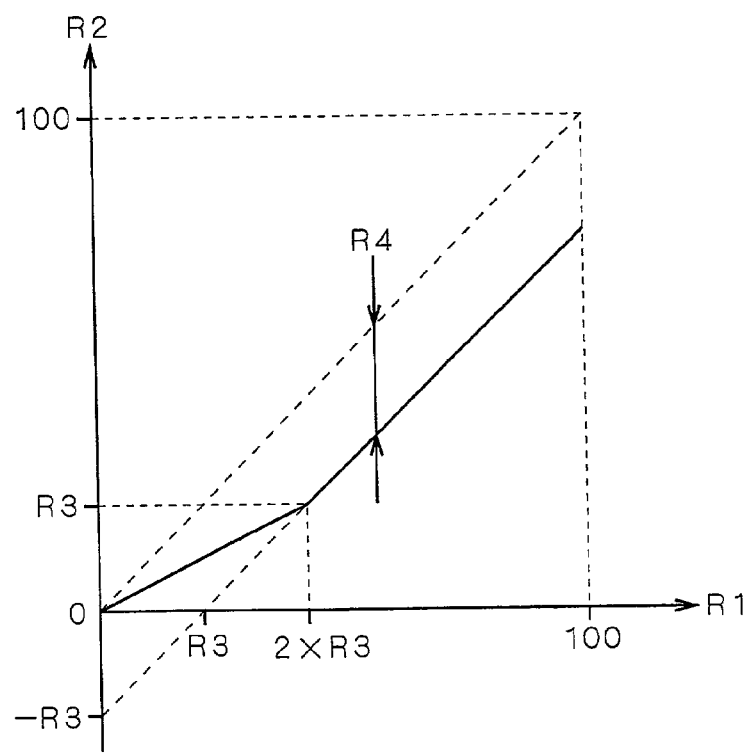

| R1 | G1 | B1 | R2 | G2 | B2 | X3 | Y3 | Z3 | RATIO TO WHITE (Y/Ymax) |
|---|---|---|---|---|---|---|---|---|---|
| 0 | 0 | 0 | 0 | 0 | 0 | 10.505 | 11.000 | 11.890 | 0.109 |
| 10 | 10 | 10 | 5 | 5 | 5 | 15.258 | 16.000 | 17.335 | 0.158 |
| 20 | 20 | 20 | 10 | 10 | 10 | 20.010 | 21.000 | 22.780 | 0.208 |
| 30 | 30 | 30 | 20 | 20 | 20 | 29.515 | 31.000 | 33.670 | 0.307 |
| 40 | 40 | 40 | 30 | 30 | 30 | 39.020 | 41.000 | 44.560 | 0.406 |
| 50 | 50 | 50 | 40 | 40 | 40 | 48.525 | 51.000 | 55.450 | 0.505 |
| 60 | 60 | 60 | 50 | 50 | 50 | 58.030 | 61.000 | 66.340 | 0.604 |
| 70 | 70 | 70 | 60 | 60 | 60 | 67.535 | 71.000 | 77.230 | 0.703 |
| 80 | 80 | 80 | 70 | 70 | 70 | 77.040 | 81.000 | 88.120 | 0.802 |
| 90 | 90 | 90 | 80 | 80 | 80 | 86.545 | 91.000 | 99.010 | 0.901 |
| 100 | 100 | 100 | 90 | 90 | 90 | 96.050 | 101.000 | 109.900 | 1.000 |

FIG. 12

F I G . 13
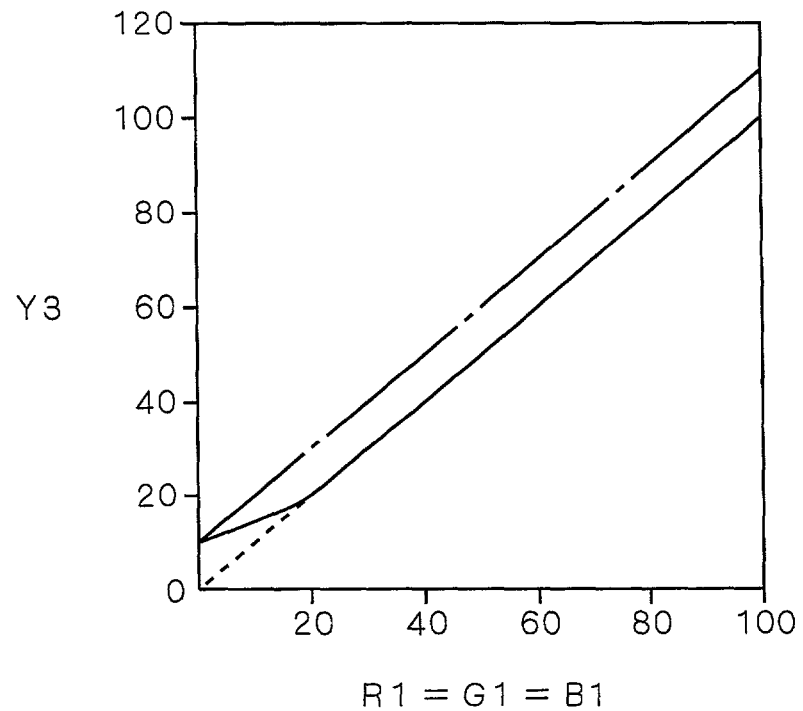
——— IMAGE DISPLAY DEVICE OF SECOND PREFERRED EMBODIMENT
(UNDER INFLUENCE OF EXTERNAL LIGHT)
------- UNDER NO INFLUENCE OF EXTERNAL LIGHT
—·—· CONVENTIONAL IMAGE DISPLAY DEVICE
(UNDER INFLUENCE OF EXTERNAL LIGHT)

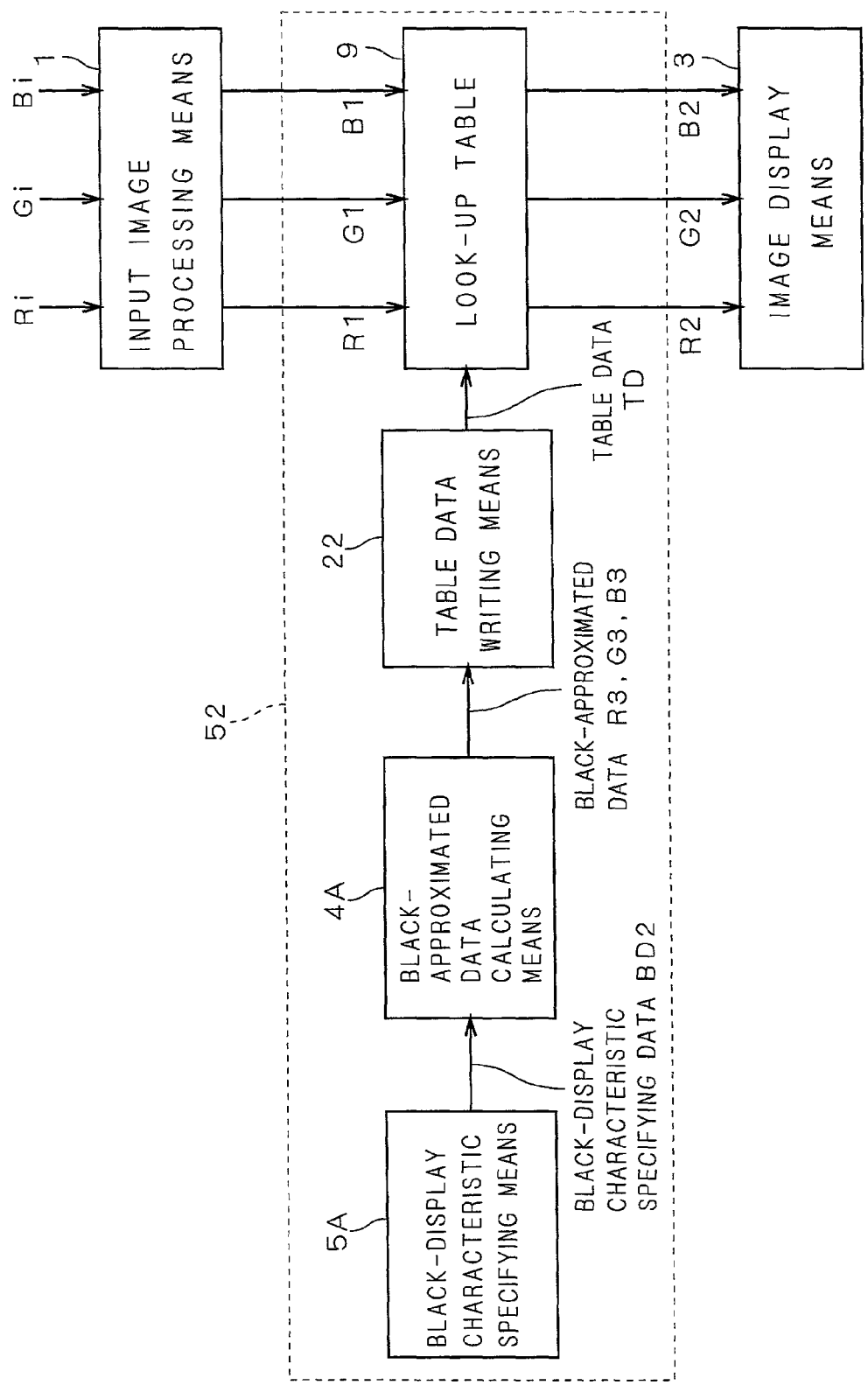
F I G . 1 4

| BLACK-DISPLAY CHARACTERISTIC SPECIFYING DATA BD2 (BLACK-DISPLAY BRIGHTNESS) | SPECIFIED VALUE (Ybke+Ye) OF LUMINANCE IN DISPLAYING BLACK (cd/m²) |
|:---:|:---:|
| 0 | 0 |
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |
| 10 | 100 |

F I G . 25
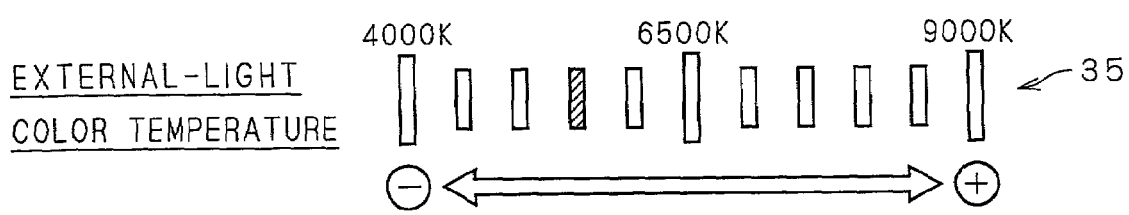
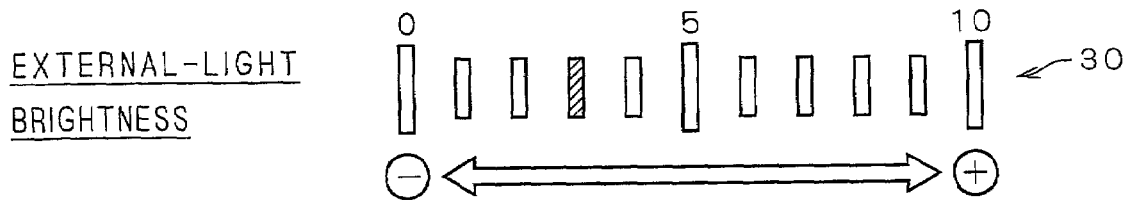

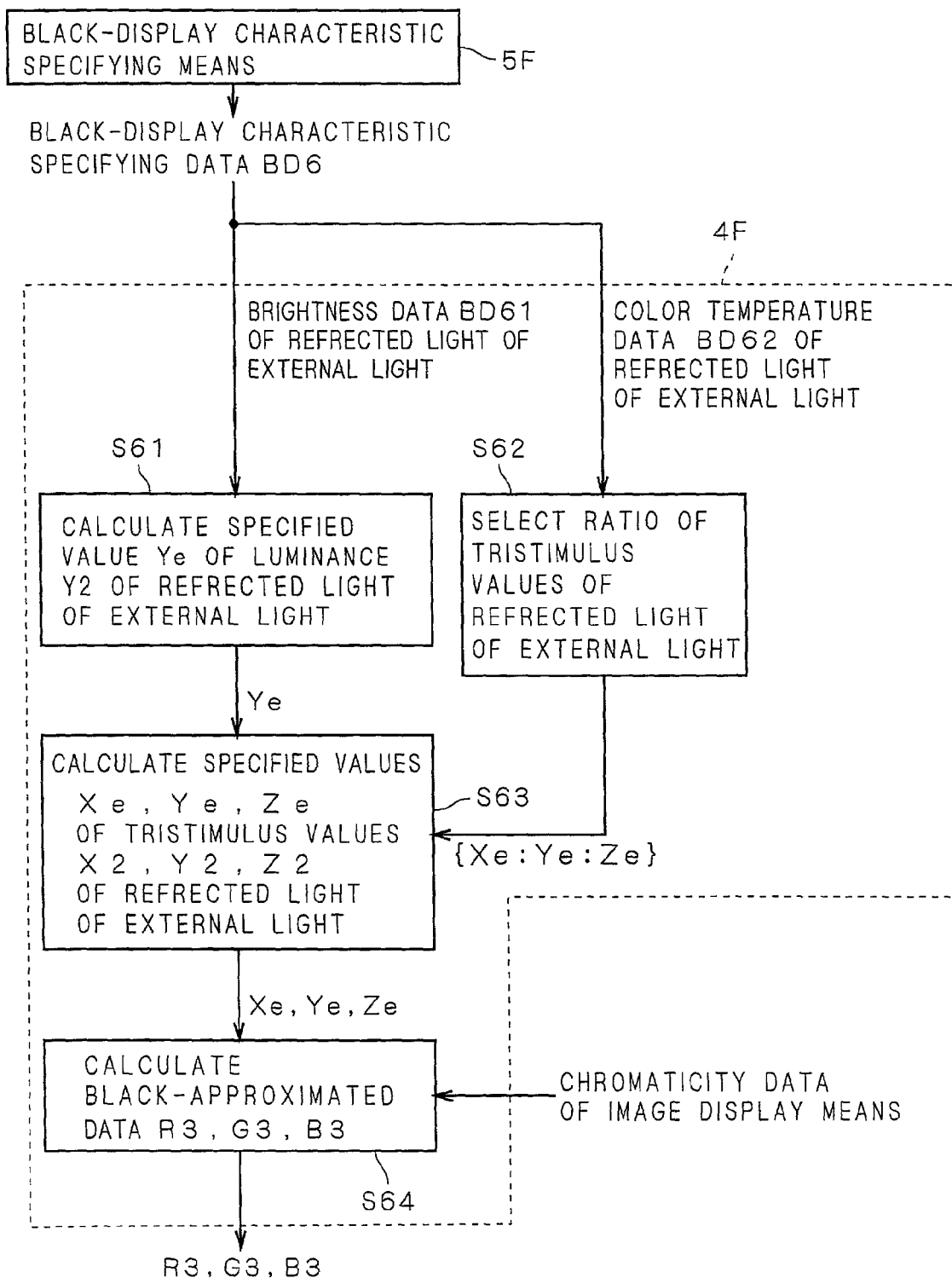
F I G . 26

| R1 | G1 | B1 | X3 | Y3 | Z3 | RATIO TO WHITE (Y/Ymax) |
|---|---|---|---|---|---|---|
| 0 | 0 | 0 | 1.000 | 1.000 | 1.000 | 0.010 |
| 10 | 10 | 10 | 10.505 | 11.000 | 11.890 | 0.109 |
| 20 | 20 | 20 | 20.010 | 21.000 | 22.780 | 0.208 |
| 30 | 30 | 30 | 29.515 | 31.000 | 33.670 | 0.307 |
| 40 | 40 | 40 | 39.020 | 41.000 | 44.560 | 0.406 |
| 50 | 50 | 50 | 48.525 | 51.000 | 55.450 | 0.505 |
| 60 | 60 | 60 | 58.030 | 61.000 | 66.340 | 0.604 |
| 70 | 70 | 70 | 67.535 | 71.000 | 77.230 | 0.703 |
| 80 | 80 | 80 | 77.040 | 81.000 | 88.120 | 0.802 |
| 90 | 90 | 90 | 86.545 | 91.000 | 99.010 | 0.901 |
| 100 | 100 | 100 | 96.050 | 101.000 | 109.900 | 1.000 |

FIG. 31

| R1 | G1 | B1 | X3 | Y3 | Z3 | RATIO TO WHITE (Y/Ymax) |
|---|---|---|---|---|---|---|
| 0 | 0 | 0 | 10.505 | 11.000 | 11.890 | 0.099 |
| 10 | 10 | 10 | 20.010 | 21.000 | 22.780 | 0.189 |
| 20 | 20 | 20 | 29.515 | 31.000 | 33.670 | 0.279 |
| 30 | 30 | 30 | 39.020 | 41.000 | 44.560 | 0.369 |
| 40 | 40 | 40 | 48.525 | 51.000 | 55.450 | 0.459 |
| 50 | 50 | 50 | 58.030 | 61.000 | 66.340 | 0.550 |
| 60 | 60 | 60 | 67.535 | 71.000 | 77.230 | 0.640 |
| 70 | 70 | 70 | 77.040 | 81.000 | 88.120 | 0.730 |
| 80 | 80 | 80 | 86.545 | 91.000 | 99.010 | 0.820 |
| 90 | 90 | 90 | 96.050 | 101.000 | 109.900 | 0.910 |
| 100 | 100 | 100 | 105.555 | 111.000 | 120.790 | 1.000 |

FIG. 33

| R1 | G1 | B1 | X3 | Y3 | Z3 | RATIO TO WHITE (Y/Ymax) |
|---|---|---|---|---|---|---|
| 0 | 0 | 0 | 11.505 | 12.000 | 12.890 | 0.057 |
| 10 | 10 | 10 | 30.515 | 32.000 | 34.670 | 0.151 |
| 20 | 20 | 20 | 49.525 | 52.000 | 56.450 | 0.245 |
| 30 | 30 | 30 | 68.535 | 72.000 | 78.230 | 0.340 |
| 40 | 40 | 40 | 87.545 | 92.000 | 100.010 | 0.434 |
| 50 | 50 | 50 | 106.555 | 112.000 | 121.790 | 0.528 |
| 60 | 60 | 60 | 125.565 | 132.000 | 143.570 | 0.623 |
| 70 | 70 | 70 | 144.575 | 152.000 | 165.350 | 0.717 |
| 80 | 80 | 80 | 163.585 | 172.000 | 187.130 | 0.811 |
| 90 | 90 | 90 | 182.595 | 192.000 | 208.910 | 0.906 |
| 100 | 100 | 100 | 201.605 | 212.000 | 230.690 | 1.000 |

FIG. 35

IMAGE DISPLAY DEVICE

BACKGROUND OF THE INVENTION

1. Field of the Invention

The present invention relates to image display devices for displaying color image, such as monitors and projectors. More particularly, the invention relates to an image display device used under the influence of external light, and to an image display device having a large value of luminance in displaying black because of its characteristic.

2. Description of the Background Art

FIG. 29 is a block diagram illustrating a configuration of a conventional image display device. Referring to FIG. 29, the operation of the conventional image display device will be described below. This image display device is made up of an input image processing means 1 and an image display means 3.

Image data Ri, Gi and Bi composed of three-color (RGB) data to be inputted to the image display device are inputted to the input image processing means 1. The inputted image data Ri, Gi and Bi are subjected to an input image processing to be described hereinafter in the input image processing means 1, and then outputted as image data R1, G1 and B1 composed of three color data. The image data R1, G1 and B1 from the input image processing means 1 are sent to the image display means 3. In the image display means 3, according to the corresponding image data value, each pixel emits a light for image display. Examples of the image display means are a liquid crystal panel and CRT.

FIG. 30 is a block diagram illustrating a configuration of the input image processing means 1 in FIG. 29. Referring to FIG. 30, the input image processing means 1 is made up of a pixel number transforming means 101, a color transforming means 102 and a gradation transforming means 103.

The operation of the input image processing means 1 will be described below. Image data Ri, Gi and Bi inputted to the input image processing means 1 are then inputted to the pixel number transforming means 101 in which, in order to match the number of display pixels in the image display means 3, a pixel number transformation processing of these image data is performed and outputted.

The output from the pixel number transforming means 101 is then inputted to the color transforming means 102 in which a color transformation processing is performed in consideration of the color reproduction characteristic of the image display means 3. This color transformation processing enables to realize a display at a desirable color reproduction in the image display means 3.

The output from the color transforming means 102 is then inputted to the gradation transforming means 103 in which according to the characteristic of the image display means 3, a gradation correction processing is performed and outputted as image data R1, G1 and B1. The pixel number transforming means 101, color transforming means 102 and gradation transforming means 103 may be configured with hardware or software.

Description will now be made of the relationship between the size of image data R1, G1 and B1 inputted to the image display means 3 and the color (light) displayed on the image display means 3. Tristimulus values based on the CIE XYZ colorimetric system of the color (light) displayed on the image display means 3 when image data R1, G1 and B1 are inputted to the image display means 3 under no influence of external light (hereinafter referred to simply as "tristimulus values") are taken as X1, Y1 and Z1. Assuming the image display means 3 be an image display means in which the relationship between the size of image data R1, G1 and B1 to be inputted and the tristimulus values X1, Y1 and Z1 of the color (light) to be displayed is expressed by the following equation (1).

$$\begin{bmatrix} X1 \\ Y1 \\ Z1 \end{bmatrix} = \begin{bmatrix} axr & axg & axb \\ ayr & ayg & ayb \\ azr & azg & azb \end{bmatrix} \begin{bmatrix} R1 \\ G1 \\ B1 \end{bmatrix} + \begin{bmatrix} Xbk1 \\ Ybk1 \\ Zbk1 \end{bmatrix} \quad (1)$$

wherein Y1 is a value corresponding to a luminance.

In equation (1), axr, ayr, azr, axg, ayg, azg, axb, ayb and azb, and Xbk1, Ybk1 and Zbk1 are values that depend on the characteristic of the image display means 3. Particularly, Xbk1, Ybk1 and Zbk1 are tristimulus values of the color (light) displayed on the image display means 3 when the image display means 3 displays black under no influence of external light, that is, when R1=G1=B1=0. Hereat, let axr, ayr, azr, axg, ayg, azg, axb, ayb and azb be a chromaticity data indicating the correlation between color data RGB in the image display means 3 and be tristimulus values XYZ, and a value expressed by the following equation (2).

axr=0.4124, axg=0.3576, axb=0.1805, ayr=0.2126, ayg=0.7152, ayb=0.0722, azr=0.0193, azg=0.1192, azb=0.9505     (2)

Let image data R1, G1 and B1 inputted to the image display means 3 be an integer and a value in the range expressed by the following equation (3).

$0 \leq R1 \leq 100$ $0 \leq G1 \leq 100$ $0 \leq B1 \leq 100$     (3)

Theoretically, all the tristimulus values Xbk1, Ybk1 and Zbk1 in displaying black should be "0", however, they have in fact a value larger than "0". The tristimulus values of a reflected light caused by that the surface of the image display means 3 is irradiated with an external light and the external light is reflected from the surface of the image display means 3, are taken as X2, Y2 and Z2. In this case, the tristimulus values X3, Y3 and Z3 of the light entering the eyes of a viewer of the image display device are expressed by the sum of the tristimulus values X1, Y1 and Z1 of the color displayed on the image display means 3 by input signals R1, G1 and B1, and the tristimulus values X2, Y2 and Z2 of the reflected light. That is, X3, Y3 and Z3 are expressed by the following equation (4). To the viewer, the color expressed by X3, Y3 and Z3 seems as if the color expressed by X3, Y3 and Z3 was displayed on the image display means 3.

$$\begin{bmatrix} X3 \\ Y3 \\ Z3 \end{bmatrix} = \begin{bmatrix} X1 \\ Y1 \\ Z1 \end{bmatrix} + \begin{bmatrix} X2 \\ Y2 \\ Z2 \end{bmatrix} = \begin{bmatrix} axr & axg & axb \\ ayr & ayg & ayb \\ azr & azg & azb \end{bmatrix} \begin{bmatrix} R1 \\ G1 \\ B1 \end{bmatrix} + \begin{bmatrix} Xbk1 + X2 \\ Ybk1 + Y2 \\ Zbk1 + Z2 \end{bmatrix} \quad (4)$$

From equation (4), Xbk1+X2, Ybk1+Y2, and Zbk1+Z2 are tristimulus values in displaying black on the image display means 3, taking the influence of external light into consideration. From equation (4), the variations in tristimulus values Xbk1, Ybk1 and Zbk1 in displaying black under no influence of external light, and the variations in tristimulus values X2, Y2 and Z2 of a reflected light of external light, exert the same influence on the tristimulus values X3, Y3 and Z3 of the light entering the eyes of the viewer. Therefore, description will now be made of the case that the values of Xbk1, Ybk1 and Zbk1 are fixed and the values of X2, Y2 and Z2 vary due to the influence of external light. The same is true for the case that the values of Xbk1, Ybk1 and Zbk1 vary. Hereat, Xbk1, Ybk1 and Zbk1 are values expressed by the following equation (5).

$$Xbk1=1$$

$$Ybk1=1$$

$$Zbk1=1 \quad (5)$$

FIG. 31 is an explanatory diagram showing in the form of table the relationship between R1, G1 an B1 inputted to the image display means 3 and tristimulus values X3, Y3 and Z3 of the color (light) entering the eyes of a viewer, under no influence of external light, i.e., when X2=Y2=Z2=0. FIG. 31 indicates the case that the relationship of R1=G1=B1 holds, i.e., that an achromatic data is inputted to the image display means 3.

Referring to FIG. 31, consider the case of having no influence of external light. No influence of external light results in X2=Y2=Z2=0. When the maximum values 100, 100 and 100 of image data R1, G1 and B1 are inputted to the image display means 3, the tristimulus values of the color (light) entering the eyes of a viewer in the absence of external light are X1=96.05, Y1=101 and Z1=109.9. On the other hand, when the minimum values 0, 0 and 0 of image data R1, G1 and B1 are inputted to the image display means 3, tristimulus values of the color (light) entering the eyes of the viewer in the absence of external light are X1=1, Y1=1 and Z1=1.

In FIG. 31, in the tristimulus values of the color (light) entering the eyes of a viewer when R1, G1 and B1 are inputted to the image display means 3, the ratio of a Y3 corresponding to a luminance to a Y3 when R1=100, G1=100 and B1=100 (i.e., in displaying white) is indicated as a ratio to white (Y/Ymax). As the ratio to white is smaller with respect to each image data, the viewer seems that the image displayed on the image display means 3 has a larger contrast and more excellent visibility.

FIG. 32 is a graph showing the relationship between image data R1, G1 and B1 inputted to the image display means 3 and a luminance stimulus value Y3.

Next, description will be made of an image display on an image display means 3 of a conventional image display device when the device is used under the influence of external light.

FIG. 33 is an explanatory diagram showing in the form of table the relationship between R1, G1, B1 and tristimulus values X3, Y3, Z3 of the color (light) entering the eyes of a viewer under the influence of external light. FIG. 33 indicates that the relationship of R1=G1=B1 holds, i.e., that an achromatic data is inputted to the image display means 3.

Let tristimulus values of a reflected light of external light on the surface of the image display means 3 be X2=0.505, Y2=10, and Z2=10.89. When the maximum values 100, 100 and 100 of image data R1, G1 and B1 are inputted to the image display means 3, tristimulus values of the color (light) entering the eyes of a viewer are X3=105.555, Y3=111.000 and Z3=120.790. On the other hand, when the minimum values 0, 0 and 0 of R1, G1 and B1 are inputted to the image display means 3, the tristimulus values of the color (light) entering the eyes of the viewer are X3=10.505, Y3=1.000 and Z3=11.890.

Also in FIG. 33, in the tristimulus values of the color (light) entering the eyes of a viewer when R1, G1 and B1 are inputted to the image display means 3, the ratio of a Y3 corresponding to a luminance to a Y3 when R1=100, G1=100 and B1=100 (i.e., in displaying white) is indicated as a ratio to white (Y/Ymax). As compared to the case having no influence of external light shown in FIG. 31, under the influence of external light, the resulting values are large as a whole. That is, under the influence of external light, the viewer regards the image as having a small contrast and poor visibility.

FIG. 34 is a graph showing the relationship between image data R1, G1 and B1 inputted to the image display means 3 and a luminance stimulus value Y3. In FIG. 34, a continuous line represents the case having the influence of external light, and a dotted line represents the case having no influence of external light.

In order to overcome a decrease in contrast due to the influence of external light, it can be considered that the brightness of display on the image display means 3 is increased under the influence of external light. For instance, doubling the brightness of display on the image display means 3 doubles the values of tristimulus values X1, Y1 and Z1 of the color (light) displayed on the image display means 3.

FIG. 35 is an explanatory diagram showing in the form of table the relationship between R1, G1 and B1 and tristimulus values X3, Y3 and Z3 of the color (light) entering the eyes of a viewer under the influence of external light while doubling the brightness of display on the image display means 3. FIG. 35 indicates that the relationship of R1=G1=B1 holds, i.e., that an achromatic data is inputted to the image display means 3. As in the case of FIG. 33, the tristimulus values of a reflected light of external light on the surface of the image display means 3 are taken as X2=9.505, Y2=10, and Z2=10.89.

Also in FIG. 35, in the tristimulus values of the color (light) entering the eyes of a viewer when R1, G1 and B1 are inputted to the image display means 3, the ratio of a Y3 corresponding to a luminance to a Y3 when R1=100, G1=100 and B1=100 (i.e., in displaying white) is indicated as a ratio to white (Y/Ymax). As compared to FIG. 35, by doubling the brightness of display on the image display means 3, the ratio to white can be closer to that in FIG. 31 having no influence of external light, however, it is still large as compared to FIG. 31.

In order to increase the brightness of display on the image display means 3, there are the following methods of increasing the brightness of display on the image display means 3 itself without changing the data inputted to the image display means 3, or adjusting the gain of image data R1, G1 and B1 inputted to the image display means 3 without changing the brightness of display on the image display means 3 itself.

In the former method, it is very difficult to double the brightness of display on the image display means 3 as described above, in terms of cost, power consumption and useful life.

In the latter method, it is impossible to increase the gain limitlessly because of the upper limit of image data R1, G1 and B1, and a larger gain causes a larger disarrangement of gradation.

Thus, in the conventional image display device, the influence of external light or the event that the luminance in displaying black is large due to the characteristic of the image display means, may cause a considerable large ratio to white (Y/Ymax), which is a ratio of a luminance displayed for each image data to a luminance in displaying white. Accordingly, the viewer feels that the image has a small contrast and poor visibility.

In addition, in terms of cost, power consumption and useful life, it is very difficult to suppress an increase of the ratio to a luminance in displaying white, by increasing the brightness of display on the image display means. This results in poor improvement.

SUMMARY OF THE INVENTION

According to a first aspect of the invention, an image display device comprises: a black correction part performing a black correction processing of correcting a black reproducibility of an image data containing a predetermined number of color data, to output a black-corrected image data; and an image display means performing an image display on a predetermined screen based on the black-corrected image data, the black correction part including: (i) a black-display characteristic specifying means performing a predetermined operation to specify a black-display characteristic specifying data related to a characteristic in displaying black with the image display means; (ii) a black-approximated data calculating means calculating a black-approximated data related to at least one of luminance, chromaticity and tristimulus values in displaying black based on the characteristic in displaying black with the image display means on the basis of the black-display characteristic specifying data; and (iii) a black-correction processing executing means executing the black correction processing to the image data in units of the predetermined number of color data based on the black-approximated data, to output the black-corrected image data.

According to a second aspect of the invention, the image display device of the first aspect is characterized in that the black-correction processing executing means includes a black correction means performing a subtraction processing of subtracting a subtraction data based on the black-approximated data from the image data in units of the predetermined number of color data, to output the black-corrected image data.

According to a third aspect of the invention, the image display device of the second aspect is characterized in that the subtraction data includes the black-approximated data itself.

According to a fourth aspect of the invention, the image display device of the third aspect is characterized in that the black correction means includes (i) a subtraction means subtracting the black-approximated data from the image data in units of the predetermined number of color data, to obtain data after subtraction; and (ii) a limiter setting a color data of less than "0" in the predetermined number of color data contained in the data after subtraction to "0", to obtain the black-corrected image data.

According to a fifth aspect of the invention, the image display device of the second aspect is characterized in that the black correction means includes (i) a subtraction data calculating means calculating the black-approximated data itself as the subtraction data when the image data is larger than a predetermined value; and (ii) a subtraction means subtracting the subtraction data from the image data in units of the predetermined number of color data, to obtain data after subtraction, and outputting the data after subtraction as the black-corrected image data.

According to a sixth aspect of the invention, the image display device of the fifth aspect is characterized in that the subtraction data calculating means includes a subtraction data calculating means multiplying the black-approximated data with a multiplication factor of less than "1" when the image data is less than the predetermined value, to obtain the subtraction data.

According to a seventh aspect of the invention, the image display device of the first aspect is characterized in that: the black-correction processing executing means includes a look-up table storing a table data, and a table data writing means, writing data in the form of a table capable of deriving one of the black-corrected image data from the image data as the table data, into the look-up table based on the black-approximated data; and that the look-up table obtains the black-corrected image data based on the image data by referring to the table data.

According to an eighth aspect of the invention, the image display device of the first aspect is characterized in that the black-display characteristic specifying data includes data indicating a characteristic of a reflected light of external light on the surface of the predetermined screen of the image display means.

According to a ninth aspect of the invention, the image display device of the eighth aspect is characterized in that the black-approximated data calculating means includes a black-approximated data calculating means obtaining a specified value of luminance of a reflected light of external light based on the black-display characteristic specifying data, and calculating the black-approximated data such that a difference between the luminance of the color displayed on the image display means based on the lack-approximated data and the luminance in displaying black with the image display means is equal to the specified value.

According to a tenth aspect of the invention, the image display device of the eighth aspect is characterized in that the black-approximated data calculating means includes a black-approximated data calculating means obtaining specified values of tristimulus values of a reflected light of external light based on the black-display characteristic specifying data, and calculating the black-approximated data such that a difference between the tristimulus values of the color displayed on the image display means based on the black-approximated data and the tristimulus values in displaying black with the image display means is equal to the specified values.

According to an eleventh aspect of the invention, the image display device of the eighth aspect is characterized in that: the characteristic of a reflected light of external light includes a brightness of the reflected light of external light; and that the black-approximated data calculating means includes a black-approximated data calculating means calculating the black-approximated data based on the black-display characteristic specifying data by referring to a chromaticity data indicating a ratio of tristimulus values of a reflected light of external light and a correlation between a color data and tristimulus values in the image display means.

According to a twelfth aspect of the invention, the image display device of the eleventh aspect is characterized in that: the black-display characteristic specifying data further includes data indicating the kind of an external light; and that the black-approximated data calculating means includes a black-approximated data calculating means calculating the black-approximated data based on the black-display characteristic specifying data by referring to a ratio of tristimulus values of a reflected light of an external light of the kind specified by the black-display characteristic specifying data, and the chromaticity data.

According to a thirteenth aspect of the invention, the image display device of the eleventh aspect is characterized in that: the black-display characteristic specifying data further includes data indicating a color temperature of a reflected light of external light; and that the black-approximated data calculating means includes a black-approximated data calculating means calculating the black-approximated data based on the black-display characteristic specifying data by referring to a ratio of tristimulus values of the reflected light suited for the color temperature indicated by the black-display characteristic specifying data, and the chromaticity data.

According to a fourteenth aspect of the invention, the image display device of the eighth aspect is characterized in that: the characteristic of the reflected light of external light includes a luminance of the reflected light of external light; and that the black-approximated data calculating means includes a black-approximated data calculating means calculating the black-approximated data based on the black-display characteristic specifying data by referring to a ratio of tristimulus values of a reflected light of external light, and a chromaticity data indicating a correlation between a color data and tristimulus values in the image display means.

According to a fifteenth aspect of the invention, the image display device of the eighth aspect is characterized in that: the characteristic of the reflected light of external light includes tristimulus values of the reflected light of external light; and that the black-approximated data calculating means includes a black-approximated data calculating means calculating the black-approximated data based on the black-display characteristic specifying data, by referring to a chromaticity data indicating a correlation between a color data and tristimulus values in the image display means.

According to a sixteenth aspect of the invention, the image display device of the first aspect is characterized in that the black-display characteristic specifying data includes data indicating a characteristic in displaying black with the image display means.

According to a seventeenth aspect of the invention, the image display device of the sixteenth aspect is characterized in that the black-approximated data calculating means includes a black-approximated data calculating means obtaining a specified value of luminance in displaying black based on the black-display characteristic specifying data, and calculating the black-approximated data such that a difference between the luminance of the color displayed on the image display means based on the black-approximated data and the luminance in displaying black with the image display means is equal to the specified value.

According to an eighteenth aspect of the invention, the image display device of the sixteenth aspect is characterized in that the black-approximated data calculating means includes a black-approximated data calculating means obtaining specified values of tristimulus values in displaying black based on the black-display characteristic specifying data, and calculating the black-approximated data such that a difference between the tristimulus values of the color displayed on the image display means based on the black-approximated data and the tristimulus values in displaying black with the image display means is equal to the specified values.

According to a nineteenth aspect of the invention, the image display device of the sixteenth aspect is characterized in that: the characteristic in displaying black includes a brightness in displaying black; and that the black-approximated data calculating means includes a black-approximated data calculating means calculating the black-approximated data based on the black-display characteristic specifying data by referring to tristimulus values in displaying black in the absence of external light, a ratio of tristimulus values of a reflected light of external light, and a chromaticity data indicating a correlation between a color data and tristimulus values in the image display means.

According to a twentieth aspect of the invention, the image display device of the sixteenth aspect is characterized in that the characteristic in displaying black includes a luminance in displaying black, and the black-approximated data calculating means includes a black-approximated data calculating means calculating the black-approximated data based on the black-display characteristic specifying data by referring to tristimulus values in displaying black in the absence of external light, a ratio of tristimulus values of a reflected light of external light, and a chromaticity data indicating a correlation between a color data and tristimulus values in the image display means.

In the image display device of the first aspect, a black-display characteristic specifying data is specified by the black-display characteristic specifying means, and a black correction processing is performed based on a black-approximated data derived from the black-display characteristic specifying data. Thereby, an image having a large contrast and excellent visibility to the viewer can be displayed on the image display means.

At this time, it is unnecessary to change the display brightness of the image display means, thus causing neither an increase in cost and power consumption nor a decrease in useful life in the image display means.

In the image display device of the second aspect, a black-corrected image data can be obtained by a relatively simple processing of subtracting a subtraction data based on a black-approximated data, from an image data.

In the image display device of the third aspect, the circuit configuration can be simplified by the amount that there is no need to have a function of calculating a subtraction data.

In the image display device of the fourth aspect, by providing a limiter, it is avoidable that a black-corrected image data becomes less than "0".

In the image display device of the fifth aspect, even when an image data exceeds a predetermined value and the tristimulus values in displaying black become large due to the influence of external light or the characteristic of the image display means, a large proportion of data can be displayed at the same condition as the case that the tristimulus values in displaying black are "0", by appropriately setting a predetermined value. This enables to provide an image having a large contrast and excellent visibility to the viewer.

In the image display device of the sixth aspect, the subtraction data calculating means obtains a subtraction data by multiplying a black-approximated data with a multiplication factor of less than "1" based on an image data. Therefore, even when the value of the image data is smaller than a predetermined value, it is avoidable that a black-corrected image data is less than "0".

In the image display device of the seventh aspect, the circuit configuration can be simplified by realizing a main part of the black-correction processing executing means with a look-up table.

In the image display device of the eighth aspect, a black-display characteristic specifying data includes data for specifying the characteristic of a reflected light of external light on the surface of a predetermined screen of the image display means. Therefore, an appropriate setting of a black-display characteristic specifying data provides an image display having a large contrast and excellent visibility to the viewer, even under the influence of external light.

In the black-approximated data calculating means of the image display device of the ninth aspect, a black-approximated data is calculated such that a difference between the luminance of the color displayed on the image display means based on a black-approximated data, and the luminance in displaying black with the image display means, becomes a specified value of the luminance of a reflected light of external light. Therefore, the same display as under no influence of external light can be realized under the influence of external light.

In the black-approximated data calculating means of the image display device of the tenth aspect, a black-approximated data is calculated such that a difference between the tristimulus values of the color displayed on the image display means based on a black-approximated data, and the tristimulus values in displaying black with the image display means, becomes specified values of the tristimulus values of a reflected light of external light. Thereby, under the influence of external light, the same display as under no influence of external light can be realized.

In the image display device of the eleventh aspect, even under the influence of external light, an image of a large contrast and excellent visibility to the viewer can be displayed by appropriately setting the brightness of a reflected light of external light as a characteristic of the reflected light.

In addition, since the brightness of a reflected light of external light is a general reference, a black-display characteristic specifying data can be specified by the black-display characteristic specifying means, without any special knowledge of color and light.

In the image display device of the twelfth aspect, a black-display characteristic specifying data further includes data indicating the kind of an external light. Therefore, by selecting a proper kind of the external light according to the environment in which the image display device is used, the degree of freedom and accuracy of correction of the influence of the external light are increased than the case that the kind of an external light is fixed.

In addition, no special knowledge of specifying a black-display characteristic is needed, thereby making it easy to select the kind of an external light.

In the image display device of the thirteenth aspect, a black-display characteristic specifying data contains data indicating the color temperature of a reflected light of external light. Therefore, the degree of freedom and accuracy of correction of the influence of external light can be increased by suitably selecting the color temperature of a reflected light of external light according to the environment in which the image display device is used.

In addition, it is easy for users familiar with image display devices to specify a black-display characteristic by color temperature.

In the image display device of the fourteenth aspect, the characteristic of a reflected light of external light includes the luminance of the reflected light. It is therefore able to omit a processing of finding the luminance of the reflected light that is needed in obtaining a black-approximated data.

In the image display device of the fifteenth aspect, the characteristic of a reflected light of external light includes the tristimulus values of the reflected light. It is therefore able to omit a processing of finding the tristinulus values of the reflected light that is needed in obtaining a black-approximated data.

In the image display device of the sixteenth aspect, a black-display characteristic specifying data includes data indicating the characteristic in displaying black with the image display means. Therefore, the black-approximated data calculating means can calculate a black-approximated data based on the tristimulus values in displaying black with the image display means.

This enables to provide an image having a large contrast and excellent visibility to the viewer when the tristimulus values in displaying black are large due to the characteristic of the image display means.

In the black-approximated data calculating means of the image display device of the seventeenth aspect, a black-approximated data is calculated such that a difference between the luminance of the color displayed on the image display means based on a black-approximated data, and the luminance in displaying black with the image display means, becomes a specified value of the luminance in displaying black. Thereby, the same display as in the case that the luminance in displaying black is "0" can be realized when the luminance in displaying black has a large value due to the characteristic of the image display means, in addition to the influence of external light.

In the black-approximated data calculating means of the image display device of the eighteenth, a black-approximated data is calculated such that a difference between the tristimulus values of the color displayed on the image display means based on a black-approximated data, and the tristimulus values in displaying black with the image display means, becomes specified values of tristimulus values in displaying black. Thereby, the same display as in the case that the tristimulus values in displaying black is "0" can be realized when the tristimulus values in displaying black are large due to the characteristic of the image display means, in addition to the influence of external light.

In the image display device of the nineteenth aspect, the characteristic in displaying black includes the brightness in displaying black. Thereby, an image having a large contrast and excellent visibility to the viewer can be provided by suitably setting the brightness in displaying black with the black-display characteristic specifying means.

In the image display device of the twentieth aspect, the characteristic in displaying black includes the luminance in displaying black. Thereby, an image having a large contrast and excellent visibility to the viewer can be provided by suitably setting the luminance in displaying black with the black-display characteristic specifying means.

This also enables to omit a processing of finding the luminance in displaying black that is needed in obtaining a black-approximated data.

It is an object of the present invention to overcome the foregoing problem by providing an image display device, which is capable of displaying an image of a large contrast and excellent visibility to the viewer even under the influence of external light and in the case that the luminance in displaying black has a large value due to the characteristic of an image display means, and which causes no increase in cost and power consumption and no decrease in useful life in the image display means by suppressing an increase in a ratio to a luminance in displaying white.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of an image display device according to a first preferred embodiment of the invention;

FIG. 4 is an explanatory diagram showing in the form of table the relationship between a black-display characteristic specifying data and a specified value of a luminance of an external light reflected;

FIG. 6 is an explanatory diagram showing in the form of table the relationship with the tristimulus values of the color entering the eyes of a viewer under the influence of external light in the image display device of the first preferred embodiment;

FIG. 7 is an explanatory diagram showing in the form of table the relationship with the tristimulus values of the color entering the eyes of a viewer under no influence of external light;

FIG. 10 is a block diagram illustrating a configuration of a multiplication factor calculating means in FIG. 9;

FIG. 11 is a graph showing a relationship between an image data after input processing and a black-corrected data;

FIG. 12 is an explanatory diagram showing in the form of table the relationship with the tristimulus values of the color entering the eyes of a viewer under the influence of external light in the image display device of the second preferred embodiment;

FIG. 13 is a graph showing the relationship between an image data after input processing and a luminance stimulus value;

FIG. 14 is a block diagram illustrating a configuration of an image display device according to a third preferred embodiment;

FIG. 25 is an explanatory diagram illustrating a menu of a black-display characteristic specifying means in an image display device according to an eighth preferred embodiment;

FIG. 26 is an explanatory diagram illustrating a flow of processing of calculating a black-approximated data in a black-approximated data calculating means of the eighth preferred embodiment;

FIG. 31 is an explanatory diagram showing in the form of table the relationship with the tristimulus values of the color entering the eyes of a viewer under no influence of external light;

FIG. 33 is an explanatory diagram showing in the form of table the relationship with the tristimulus values of the color entering the eyes of a viewer under the influence of external light;

FIG. 35 is an explanatory diagram showing in the form of table the relationship with the tristimulus values of the color entering the eyes of a viewer under the influence of external light, while doubling the brightness of display on the image display means.

DESCRIPTION OF THE PREFERRED EMBODIMENTS

First Preferred Embodiment

FIG. 1 is a block diagram illustrating a configuration of an image display device according to a first preferred embodiment of the invention. This image display device is made up of an input image processing means 1, black correction means 2A, image display means 3, black-approximated data calculating means 4A, and black-display characteristic specifying means 5A. A black correction part 51 is made up of the black correction means 2A, black-approximated data calculating means 4A and black-display characteristic specifying means 5A.

Referring to FIG. 1, image data Ri, Gi and Bi composed of three color data inputted to the image display device are inputted to the input image processing means 1. The input image processing means 1 performs an input image processing of the inputted image data Ri, Gi and Bi, and outputs image data after input processing R1, G1 and B1 composed of three color data.

Figure 30:
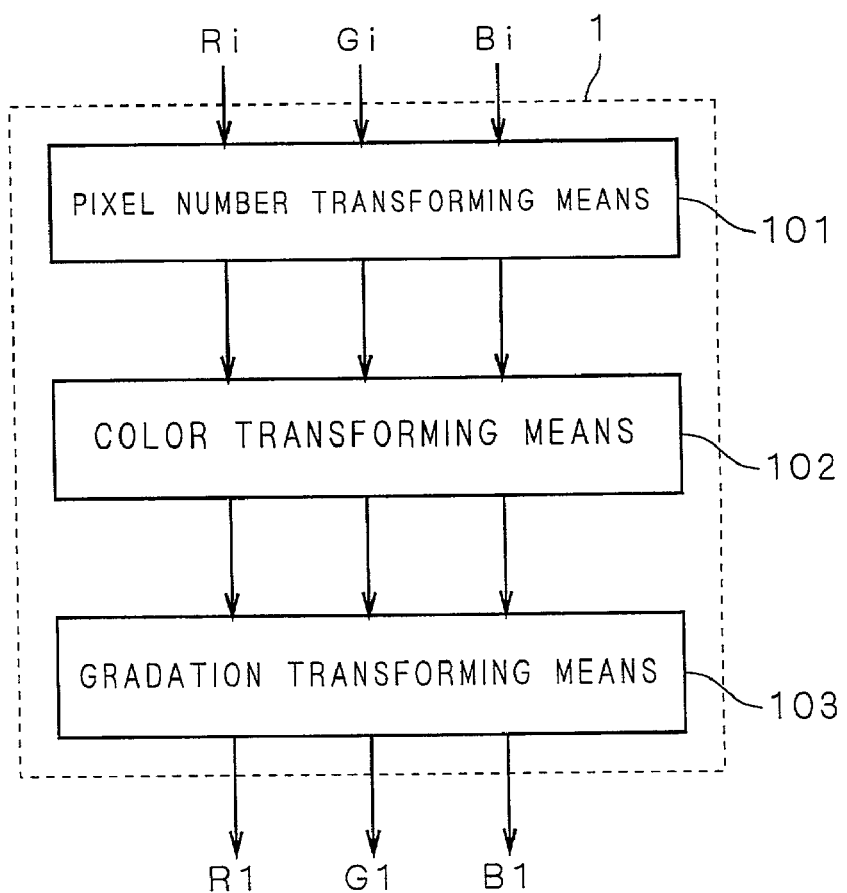
FIG. 30 is a block diagram illustrating a configuration of an input image processing means in FIG. 29.
Figure 32:
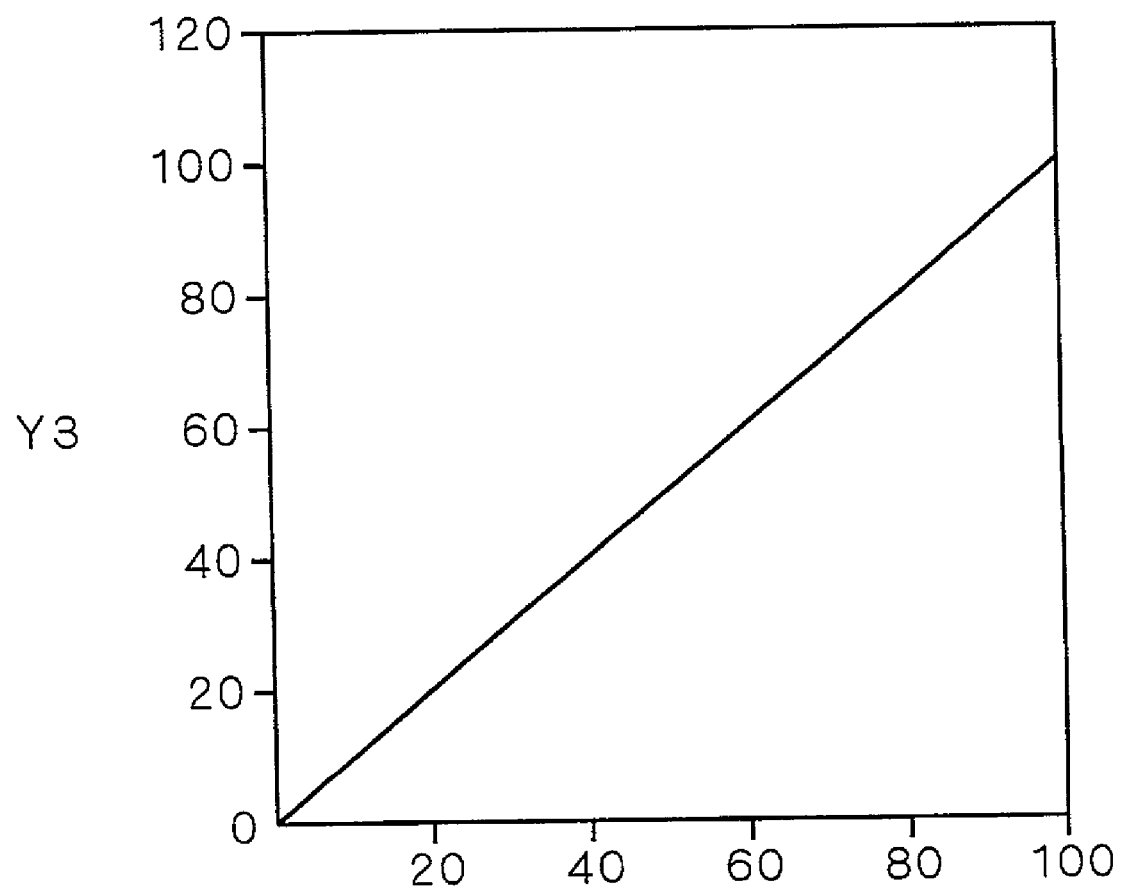
FIG. 32 is a graph showing the relationship between an image data inputted to an image display means and a luminance stimulus value.
Figure 34:
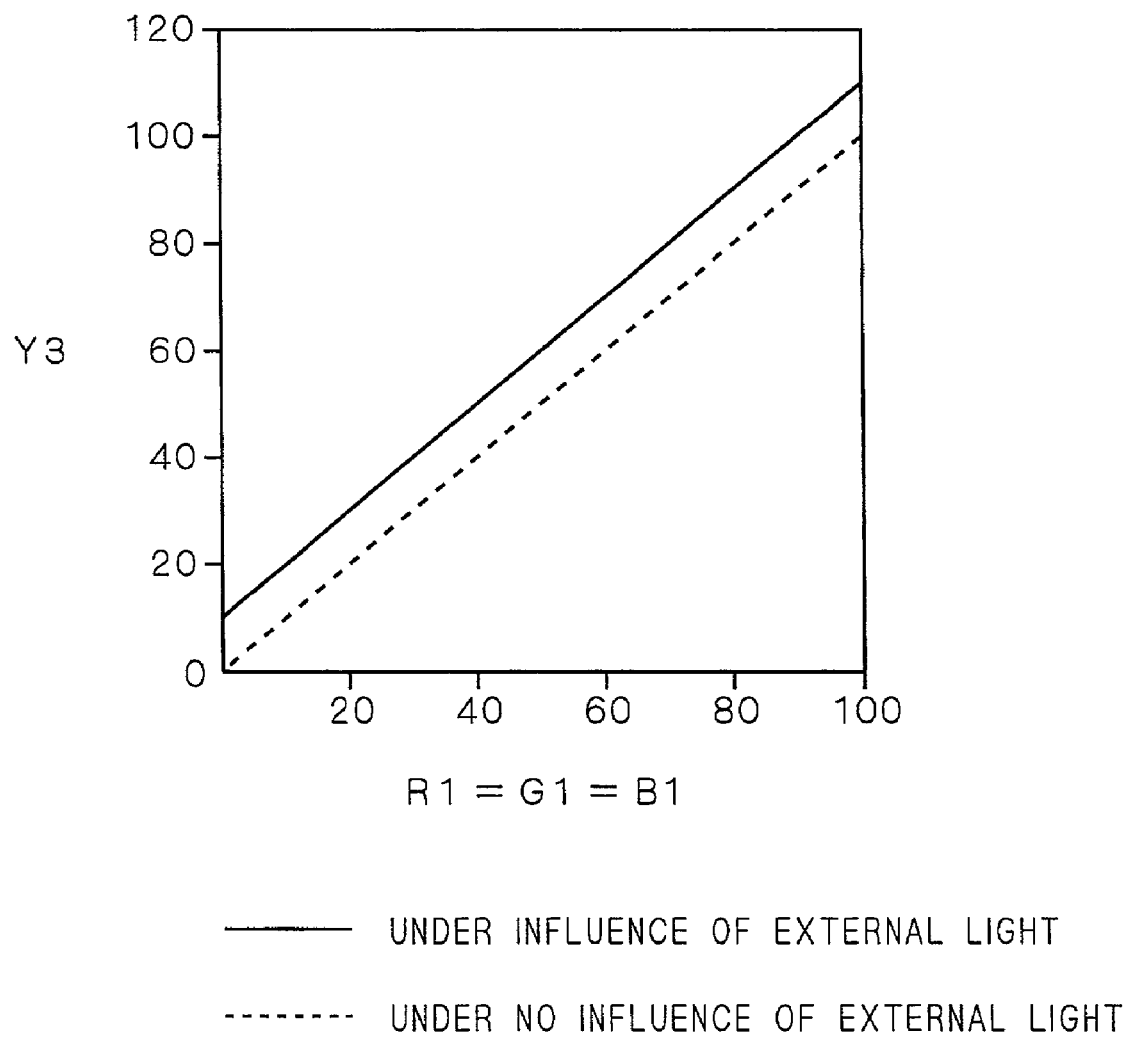
FIG. 34 is a graph showing the relationship between an image data inputted to an image display means and a luminance stimulus value.

Examples of the input image processing are gradation correction, pixel number transformation and color transformation processings according to the characteristic of an image data inputted, as described in the conventional art (see FIG. 30).

The black-display characteristic specifying means 5A can be realized by, for example, operations on a menu displayed on a (predetermined) screen of the image display means 3 and through keys provided on the image display means 3 or a remote controller. In this case, a viewer specifies a desired black-display characteristic by selecting it from the menu displayed on the image display means 3 by key input. As the black-display characteristic specifying means 5A, there are a method of providing a purpose-built panel, a method of using an input unit such as a mouse and keyboard, and the like. Description will proceed to the case of realizing with a menu displayed on a screen of the image display means 3 and keys of a remote controller.

Figure 2:
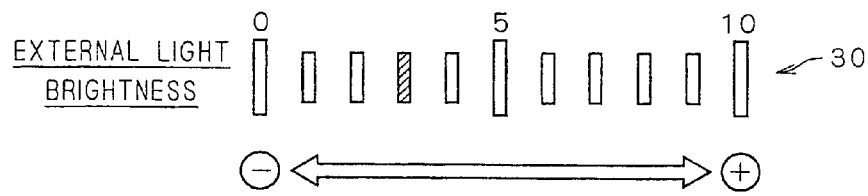
FIG. 2 is an explanatory diagram illustrating a menu of a black-display characteristic specifying means to be displayed on a screen of an image display means in FIG. 1.

FIG. 2 is an explanatory diagram illustrating a menu of the black-display characteristic specifying means 5A to be displayed on a screen of the image display means 3. Referring to FIG. 2, a viewer operates a move key, a "+" key or "−" key, of the remote controller, to set the value of an external-light brightness specifying bar 30 for specifying the brightness of the external light reflected from the surface of the screen of the image display means 3. In the external-light brightness specifying bar 30, the display color or display brightness is changed to inform the viewer of the set value. In the example of FIG. 2, the external light brightness is set at the third step.

In the black-display characteristic specifying means 5A, a black-display characteristic specifying data BD1 to specify the brightness of the external light reflected from the surface of the image display means 3 is generated from the value of the external-light brightness specifying bar 30 that is specified by the viewer. For instance, the value of the external-light brightness specifying bar 30 can be adopted as a black-display characteristic specifying data BD1. Therefore, in the example of FIG. 2, the black-display characteristic specifying means 5A outputs "3" as a black-display characteristic specifying data BD1, to the black-approximated data calculating means 4A.

Based on the black-display specifying data BD1, the black-approximated data calculating means 4A calculates black-approximated data R3, G3 and B3 that are data related to at least one of a luminance, chromaticity and tristimulus values (three image index values) in the image display means 3, and then outputs the result to the black correction means 2A.

Figure 3:
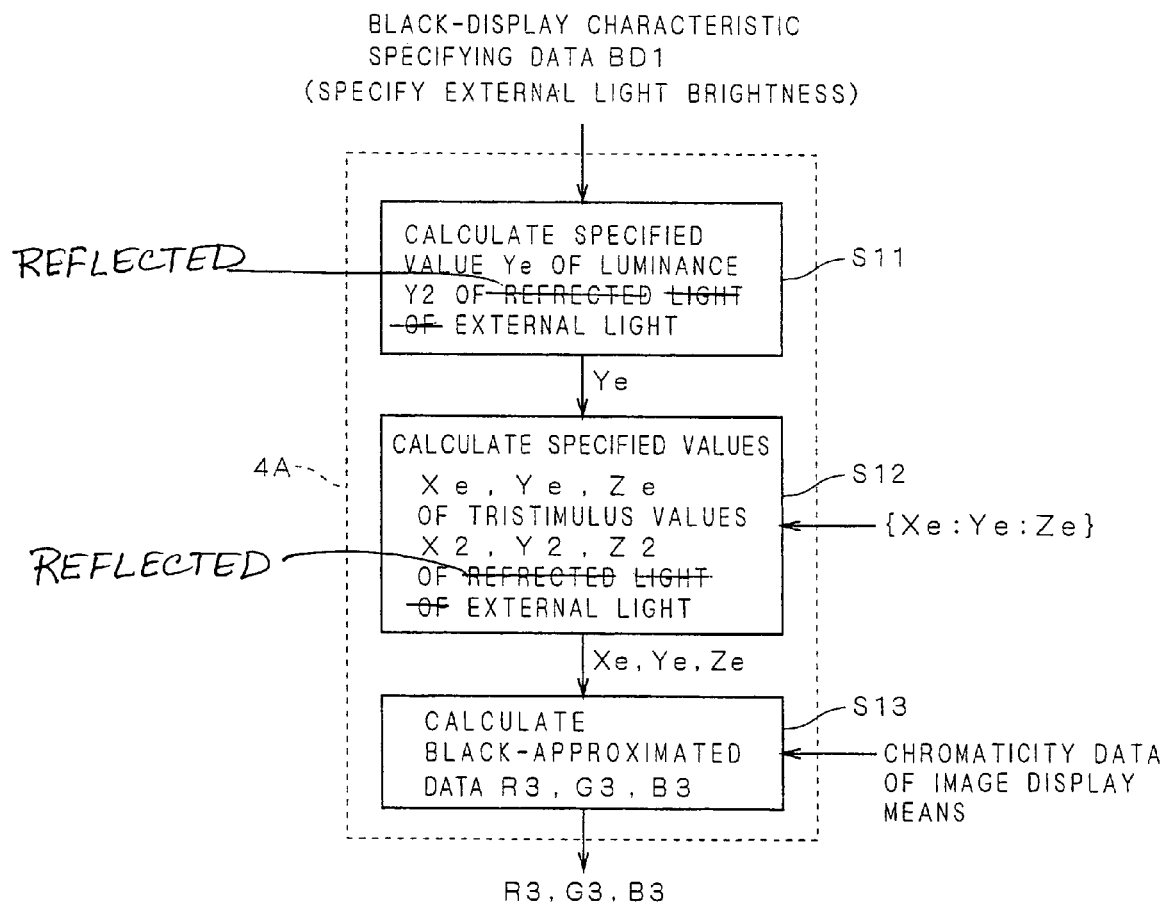
FIG. 3 is an explanatory diagram illustrating a flow of processing of calculating a black approximated data in a black-approximated data calculating means in the first preferred embodiment.

FIG. 3 is an explanatory diagram illustrating a flow of processing of calculating black-approximated data R3, G3 and B3 in the black-approximated data calculating means 4A. Referring to FIG. 3, a processing of calculating black-approximated data R3, G3 and B3 to be performed by the black-approximated data calculating means 4A will be described below.

Firstly, in step S11, from the value of a black-display characteristic specifying data BD 1, a specified value Ye of a luminance Y2 of the external light reflected from the image display means 3, which value is specified by a viewer, is calculated from a predetermined reference.

FIG. 4 is an explanatory diagram showing in the form of table the relationship between the black-display characteristic specifying data BD1 and the specified value Ye of the luminance Y2 of an external light reflected.

Specifically, in step S11, the relationship shown in FIG. 4 is used as a predetermined reference, and the viewer-specified value Ye of the luminance of the external light reflected from the image display means 3 is calculated from the value of the black-display characteristic specifying data BD1.

Further, the black-approximated data calculating means 4A has in advance a ratio of tristimulus values based on the CIE XYZ colorimetric system of the external light reflected from the image display means 3 (hereinafter referred to simply as "tristimulus values").

In step S12, Xe, Ye and Ze that are values specified by the viewer with respect to the tristimulus values X2, Y2 and Z2 of the external light reflected from the image display means 3, are calculated from the ratio of tristimulus values and the viewer-specified value Ye, both of which are described above. The ratio of tristimulus values of the reflected light of external light, which is held in the black-approximated data calculating means 4A, may be set in advance from the value obtained by measurement in advance under the environment in which the image display device is used. If such environment is unaware in advance, the ratio of tristimulus values of a representative light source may be used. For instance, if it is assumed that a spectral distribution of a reflected light of external light is the same as that of $D_{65}$ that is a standard light source, X3:Ye:Ze=0.9505:1:1.089. Thus, the values of Xe and Ze can be found from the value of Ye.

When Xe and Ze are found from Ye by assuming a spectrum distribution of a reflected light of external light, a difference between the actual spectrum distribution of external light and the assumed spectrum distribution results in a difference in the chromaticity of the color displayed on the image display means 3 by black-corrected image data R2, G2 and B2.

In step S13, black-approximated data R3, G3 and B3 are calculated by using the chromaticity data of the image display means 3 (i.e., data indicating the correlation between the color data RGB and tristimulus values XYZ in the image display means 3 (axr, ayr, azr, axg, ayg, azg, axb, ayb, azb)) from Xe, Ye and Ze, which are the values specified by the viewer in step S12 with respect to the external light reflected from the image display means 3. Its method will fully be described below.

When the black-corrected data R2, G2 and B2 are inputted to the image display means 3 under no influence of external light, the tristimulus values of the color displayed on the image display means 3 are taken as X1, Y1 and Z1. The relationship between the size of the black-corrected data R2, G2 and B2 to be inputted and the tristimulus values X1, Y1 and Z1 of the color displayed on the image display means 3, is expressed by the following equation (6). Hereat, tristimulus values correspond to a luminance and chromaticity, and Y1 of the tristimulus values is a value corresponding to a luminance.

$$\begin{bmatrix} X1 \\ Y1 \\ Z1 \end{bmatrix} = \begin{bmatrix} axr & axg & axb \\ ayr & ayg & ayb \\ azr & azg & azb \end{bmatrix} \begin{bmatrix} R2 \\ G2 \\ B2 \end{bmatrix} + \begin{bmatrix} Xbk1 \\ Ybk1 \\ Zbk1 \end{bmatrix} \quad (6)$$

In equation (6), axr, ayr, azr, axg, ayg, azg, axb, ayb, azb, and Xbk1, Ybk1, Zbk1, are values that depend on the characteristic of the image display means 3, and these values can be found in advance by measurement. Particularly, Xbk1, Ybk1 and Zbk1 are the tristimulus values of the color displayed on the image display means 3 when the image display means 3 displays black under no influence of external light, that is, when R2=G2=B2=0. For instance, when a liquid crystal display is used as an image display means 3, by changing the transmittance of liquid crystal, the transmittance amount of the light from a light source is changed to provide image display. Even in displaying black, the light from the light source cannot be blocked completely, and Xbk1, Ybk1 and Zbk1 usually have a value not "0".

When the surface of the image display means 3 is irradiated with an external light and the external light is reflected from the surface of the image display means 3, tristimulus values X3, Y3 and Z3 of the light entering the eyes of the viewer of the image display means 3 are expressed by the sum of the tristimulus values X1, Y1 and Z1 of the color displayed on the image display means 3 by black-corrected image data R2, G2 and B2, and the tristimulus values X2, Y2 and Z2 of the reflected light. That is, X3, Y3 and Z3 are expressed by the following equation (7). The viewer perceives as if the color expressed by X3, Y3 and Z3 was displayed on the image display means 3.

$$\begin{bmatrix} X3 \\ Y3 \\ Z3 \end{bmatrix} = \begin{bmatrix} X1 \\ Y1 \\ Z1 \end{bmatrix} + \begin{bmatrix} X2 \\ Y2 \\ Z2 \end{bmatrix} = \begin{bmatrix} axr & axg & axb \\ ayr & ayg & ayb \\ azr & azg & azb \end{bmatrix} \begin{bmatrix} R2 \\ G2 \\ B2 \end{bmatrix} + \begin{bmatrix} Xbk1 + X2 \\ Ybk1 + Y2 \\ Zbk1 + Z2 \end{bmatrix} \quad (7)$$

From equation (7), Xbk1+X2, Ybk1+Y2, and Zbk1+Z2 are tristimulus values in displaying black on the image display means 3, taking the influence of external light into consideration. From equation (7), the variations in the tristimulus values Xbk1, Ybk1 and Zbk1 in displaying black under no influence of external light, and the variations in the tristimulus values X2, Y2 and Z2 of a reflected light of external light, exert the same influence on the tristimulus values X3, Y3 and Z3 of the light entering the eyes of the viewer. In the first preferred embodiment, the case of correcting the influence of tristimulus values X2, Y2 and Z2 of a reflected light of external light will be described.

When the influence of the tristimulus values X2, Y2 and Z2 of a reflected light of external light is corrected by the black correction means 2A, these tristimulus values X2, Y2 and Z2 are considered as a virtual increment of emission in the image display means 3. In this case, black-approximated data R3, G3 and B3 become data for generating the virtual increment of emission which are inputted to the image display means 3. Here black-corrected data R2, G2 and B2 to be inputted to the image display means 3 under no influence of external light, are especially taken as R20, G20 and B20. Tristimulus values of the color (light) displayed on the image display means 3 under no influence of external light are expressed by the following equation (8), which is given by replacing R2, G2 and B2 in equation (6), with R20, G20 and B20, respectively.

$$\begin{bmatrix} X1 \\ Y1 \\ Z1 \end{bmatrix} = \begin{bmatrix} axr & axg & axb \\ ayr & ayg & ayb \\ azr & azg & azb \end{bmatrix} \begin{bmatrix} R20 \\ G20 \\ B20 \end{bmatrix} + \begin{bmatrix} Xbk1 \\ Ybk1 \\ Zbk1 \end{bmatrix} \quad (8)$$

Since under the influence of external light, the above-mentioned tristimulus values X2, Y2 and Z2 of the reflected light of external light are considered as a virtual increment of emission due to the black-approximated data R3, G3 and B3 in the image display means 3, equation (7) can be rewritten into the following equation (9).

$$\begin{bmatrix} X3 \\ Y3 \\ Z3 \end{bmatrix} = \begin{bmatrix} X1 \\ Y1 \\ Z1 \end{bmatrix} + \begin{bmatrix} X2 \\ Y2 \\ Z2 \end{bmatrix} = \begin{bmatrix} axr & axg & axb \\ ayr & ayg & ayb \\ azr & azg & azb \end{bmatrix} \begin{bmatrix} R20 + R3 \\ G20 + G3 \\ B20 + B3 \end{bmatrix} + \begin{bmatrix} Xbk1 \\ Ybk1 \\ Zbk1 \end{bmatrix} \quad (9)$$

From equations (8) and (9), the following equation (10) is obtained.

$$\begin{bmatrix} R3 \\ G3 \\ B3 \end{bmatrix} = \begin{bmatrix} axr & axg & axb \\ ayr & ayg & ayb \\ azr & azg & azb \end{bmatrix}^{-1} \begin{bmatrix} X2 \\ Y2 \\ Z2 \end{bmatrix} \quad (10)$$

By using equation (10), black-approximated data R3, G3 and B3 are obtainable from the tristimulus values X2, Y2 and Z2 of a reflected light of external light on the surface of the image display means 3. In calculating black-approximated data R3, G3 and B3 in the first preferred embodiment, specified values Xe, Ye and Ze of the tristimulus values of a reflected light of external light are used instead of the tristimulus values X2, Y2 and Z2. In this case, black-approximated data R3, G3 and B3 are found from equation (11), which is given by replacing X2, Y2 and Z2 in equation (10), with Xe, Ye and Ze, respectively.

$$\begin{bmatrix} R3 \\ G3 \\ B3 \end{bmatrix} = \begin{bmatrix} axr & axg & axb \\ ayr & ayg & ayb \\ azr & azg & azb \end{bmatrix}^{-1} \begin{bmatrix} Xe \\ Ye \\ Ze \end{bmatrix} \quad (11)$$

Description will now be made of black-approximated data R3, G3 and B3. Black-approximated data R3, G3 and B3 are data to be calculated from a luminance or chromaticity in displaying black with the image display means 3, which is specified by a viewer. A luminance or chromaticity in displaying black under no influence of external light and a luminance or chromaticity of a reflected light of external light, are related to a luminance or chromaticity in displaying black. The luminance or chromaticity in displaying black under no influence of external light relates to the characteristic of the image display means 3, and the luminance or chromaticity of a reflected light of external light relates to the brightness or chromaticity of the external light reflected from the image display means 3.

Tristimulus values X31, Y31 and Z31 of the color displayed when black-approximated data R3, G3 and B3 are inputted to the image display means 3, are X3, Y3 and Z3 when R2=R3, G2=G3, and B2=B3 in equation (7). From equations (11) and (7), the following equation (12) is obtained.

$$\begin{bmatrix} X31 \\ Y31 \\ Z31 \end{bmatrix} = \begin{bmatrix} Xe \\ Ye \\ Ze \end{bmatrix} + \begin{bmatrix} Xbk1 + X2 \\ Ybk1 + Y2 \\ Zbk1 + Z2 \end{bmatrix} \quad (12)$$

Tristimulus values X30, Y30 and Z30 in displaying black on the image display means 3 are obtainable by setting to that R2=0, G2=0, and B2=0 in equation (7), and are expressed by the following equation (13):

$$\begin{bmatrix} X30 \\ Y30 \\ Z30 \end{bmatrix} = \begin{bmatrix} Xbk1 + X2 \\ Ybk1 + Y2 \\ Zbk1 + Z2 \end{bmatrix} \quad (13)$$

From equations (12) and (13), a difference between the tristimulus values X3 1, Y31 and Z31 of the color displayed when black-approximated data R3, G3 and B3 are inputted to the image display means 3, and the tristimulus values X30, Y30 and Z30 in displaying black on the image display means 3, is the tristimulus values Xe, Ye and Ze of the reflected light of external light on the surface of the image display means 3, which has been specified by the viewer. As concerns only a luminance component Y (e.g., Y30 and Y31) in the tristimulus values, the above-mentioned relationship holds again in luminance.

Black-approximated data R3, G3 and B3 calculated in the black-approximated data calculating means 4A are inputted to the black correction means 2A.

The black correction means 2A for executing a black correction processing receives image data after input processing R1, G1 and B1 obtained by the input image processing means 1 and also the black-approximated data R3, G3 and B3, thereby to calculate and output black-corrected image data R2, G2 and B2. The black-corrected image data R2, G2 and B2 from the black correction means 2A are then sent to the image display means 3.

The term "black correction" in the present specification means correction of black reproducibility, and is used in general for correction of "black fading" due to the influence of external light, and for correction of "black fading" due to the characteristic of an image display means. The term "black fading" means such a phenomenon that black is not the real black but it looks like a brighter gray. The black fading lowers the contrast of image and gives the viewer such an impression that the image is whitish as a whole.

Specifically, "black correction" means that when the influence of external light is large, alternatively, the luminance or tristimulus values in displaying black on an image display means is large, an image signal processing is performed so that the luminance, chromaticity or tristimulus values of the color displayed on the image display means are equated to that when the influence of external light is small, alternatively, the luminance or tristimulus values in displaying black on the image display means is small.

In the image display means 3, each pixel emits a light according to the value of the corresponding black-corrected image data R2, G2 and B2, thereby performing an image display processing on a predetermined screen. Examples of the image display means 3 are a liquid crystal panel or CRT.

Figure 5:
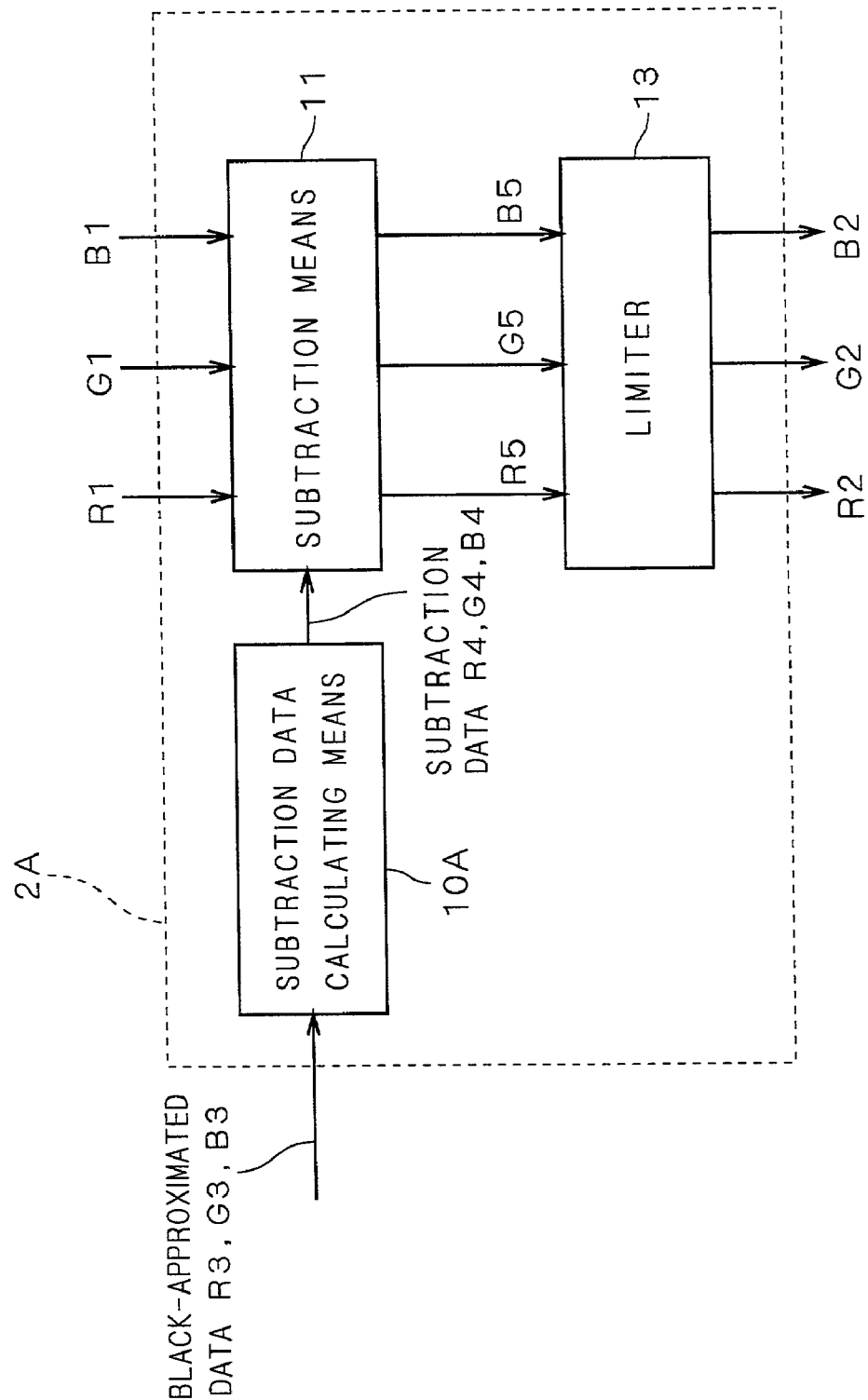
FIG. 5 is a block diagram illustrating an internal configuration of a black correction means in FIG. 1.

FIG. 5 is a block diagram illustrating an internal configuration of the black correction means 2A in FIG. 1. As shown in FIG. 5, the black correction means 2A is made up of a subtraction data calculating means 10A, a subtraction means 11, and a limiter 13.

Referring to FIG. 5, the operation of the black correction means 2A will be described. Black-approximated data R3, G3 and B3 inputted to the black correction means 2A are then inputted to the subtraction data calculating means 10A. From the inputted black-approximated data R3, G3 and B3, the subtraction data calculating means 10A calculates and outputs subtraction data R4, G4 and B4. With the subtraction data calculating means 10A in the first preferred embodiment, the black-approximated data R3, G3 and B3 are directly outputted as subtraction data R4, G4 and B4, namely, it is assumed that R4=R3, G4=G3, and B4=B3.

The subtraction data calculating means 10A is merely required to be configured such that black-approximated data R3, G3 and B3 can be directly outputted as subtraction data R4, G4 and B4. Therefore, the subtraction data calculating means 10A can be realized with a simple circuit configuration, and it may be configured with hardware or software.

On receipt of the image data after input processing R1, G1, B1 and the subtraction data R4, G4, B4, the subtraction means 11 performs a relatively simple subtraction processing shown in the following equation (14), to calculate and output data after subtraction R5, G5 and B5. The subtraction means 11 may be configured with hardware such as a subtracter, alternatively, it may be realized with software.

R5=R1−R4

G5=G1−G4

B5=B1−B4 (14)

The data after subtraction R5, G5 and B5 outputted from the subtraction means 11 are then inputted to the limiter 13. In the limiter 13, data having a negative value in the data after subtraction R5, G5 and B5 is regarded as "0", and data having a value more than "0" is directly outputted as black-corrected image data R2, G2 and B2. It is therefore able to reliably avoid the disadvantage that black-corrected image data R2, G2 and B2 are less than "0".

Assume that the image display means 3 is one in which the relationship between the size of black-corrected image data R2, G2 and B2 to be inputted and tristimulus values X1, Y1 and Z1 of a color (light) to be displayed is expressed by the following equation (15) in equation (6).

axr=0.4124, axg=0.3576, axb=0.1805, ayr=0.2126, ayg=0.7152, ayb=0.0722, azr=0.0193, azg=0.1192, azb=0.9505 (15)

In equation (6), Xbk1, Ybk1 and Zbk1 are values expressed by the following equation (16).

Xbk1=1

Ybk1=1

Zbk1=1 (16)

Assume that data after input processing R1, G1 and B1 to be outputted from the input image processing means 1 are integers and values in the range expressed by the following equation (17).

0≦R1≦100

0≦G1≦100

0≦B1≦100 (17)

Tristimulus values of a reflected light of external light on the surface of the image display means 3 are taken as X2=9.505, Y2=10, and Z2=10.89. In this time, from equation (10), a black-approximated data should be R3=10, G3=10, and B3=10. Therefore, when the black-approximated data calculated based on black-display characteristic specifying data by the black-approximated data calculating means 4A are R3=10, G3=10, and B3=10, that is, when X2=Xe, Y2=Y3, and Z2=Ze, the influence of external light can be corrected most suitably. Since in the first preferred embodiment, R4=R3, G4=G3, and B4=B3, the data after subtraction R5, G5 and B5 to be outputted from the subtraction means 11 are expressed by the following equation (18).

$$R5=R1-10$$

$$G5=G1-10$$

$$B5=B1-10 \quad (18)$$

Here, the data after subtraction R5, G5 and B5 have a negative value when the image data after input processing R1, G1 and B1 have a value less than 10. Therefore, in the limiter 13, such a negative value is replaced with "0", and then outputted as black-corrected data R2, G2 and B2.

Thus, with the image display device of the first preferred embodiment, the influence of external light can be removed in a pseudo fashion by subtracting the subtraction data R4, G4 and B4 (i.e., black-corrected image data R2, G2 and B2) from the image data after input processing R1, G1 and B1.

FIG. 6 is an explanatory diagram showing in the form of table the relationship between image data after input processing R1, G1, B1 and black-corrected data R2, G2, B2, and tristimulus values X3, Y3, Z3 based on the CIE XYZ colorimetric system of the color (light) entering the eyes of a viewer under the influence of external light in the image display device of the first preferred embodiment. Specifically, FIG. 6 shows the case that the relationship of R1=G1=B1 holds, i.e., that an achromatic data is inputted to the black correction means 2A.

In FIG. 6, in the tristimulus values of the color (light) entering the eyes of the viewer when R2, G2 and B2 are inputted to the image display means 3, the ratio of a Y3 corresponding to a luminance to a Y3 when R1=100, G1=100 and B1=100 (i.e., in displaying white) is indicated as a ratio to white (Y/Ymax).

FIG. 7 is an explanatory diagram showing in the form of table the relationship between image data after input processing R1, G1 and B1, and tristimulus values X3, Y3, Z3 of the color (light) entering the eyes of a viewer, under no influence of external light. Note that under no influence of external light, black-approximated data are R3=0, G3=0, and B3=0.

A comparison of FIG. 6 with FIG. 7 indicates that in the image display device of the first preferred embodiment, the same display as under no influence of external light is realized when the image data after input processing R1, G1, B1 have a larger than black-approximated data R3, G3, B3 (=10, 10, 10).

In general, black-approximated data R3, G3 and B3 usually have a small value, namely about one tenth that of image data after input processing R1, G1 and B1. With the image display device of the first preferred embodiment, even under the influence of external light, a large proportion of data can be displayed at the same condition as under no influence of external light, in the following manner that a viewer specifies the brightness of an external light reflected as a black-display characteristic specifying data BD1, by using the black-display characteristic specifying means 5A. This enables to provide an image having a large contrast and excellent visibility to the viewer.

There are also the following advantages. Firstly, since the viewer can specify a black-display characteristic with the brightness of an external light reflected, no special knowledge and experience for specifying a black-display characteristic is needed, and it is easy to specify the black-display characteristic.

Secondly, in the image display device of the first preferred embodiment, an image processing of the data inputted to the image display means 3 is performed without changing the brightness of display on the image display means 3. This causes no problem of increasing cost and power consumption and decreasing useful life.

Thirdly, since the brightness of a reflected light of external light is a general reference, the viewer can specify a black-display characteristic specifying data with the black-display characteristic specifying means 5A, without any special knowledge about color and light.

Fourthly, disarrangement of gradation may occur if data after input processing R1, G1 and B1 have a value smaller than black-approximated data R3, G3 and B3, respectively. However, as described above, the black-approximated data R3, G3 and B3 usually have a small value of about one tenth at the most, than the data after input processing R1, G1 and B1. Therefore, the device is free of such a large disarrangement of gradation as in the case of increasing the gain of the data inputted to the image display means 3.

Figure 8:
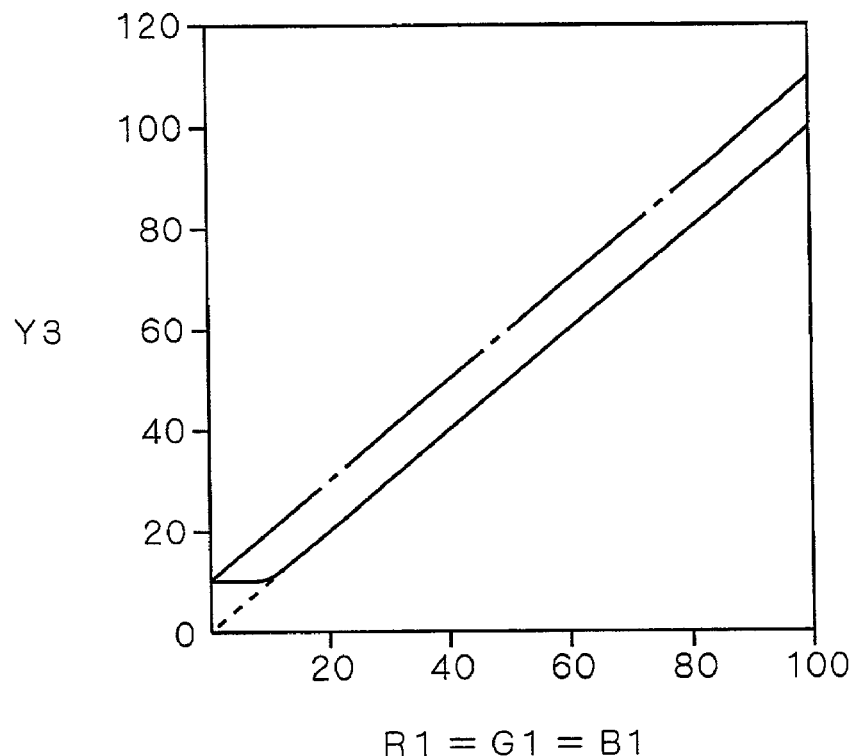
FIG. 8 is a graph showing the relationship between an image data after input processing and a luminance stimulus value.

FIG. 8 is a graph showing the relationship between image data after input processing R1, G1, B1 and a luminance stimulus value Y3. In FIG. 8, a continuous line represents the image display device of the first preferred embodiment under the influence of external light, an alternate long and short dash line represents a conventional image display device under the influence of external light, and a dotted line represents the case having no influence of external light in the first preferred embodiment or the conventional device. From FIG. 8, it can be easily understood that the same display as under no influence of external light is realized when image data after input processing R1, G1 and B1 have a value larger than black-approximated data R3, G3, B3 (=10, 10, 10).

Second Preferred Embodiment

Figure 9:
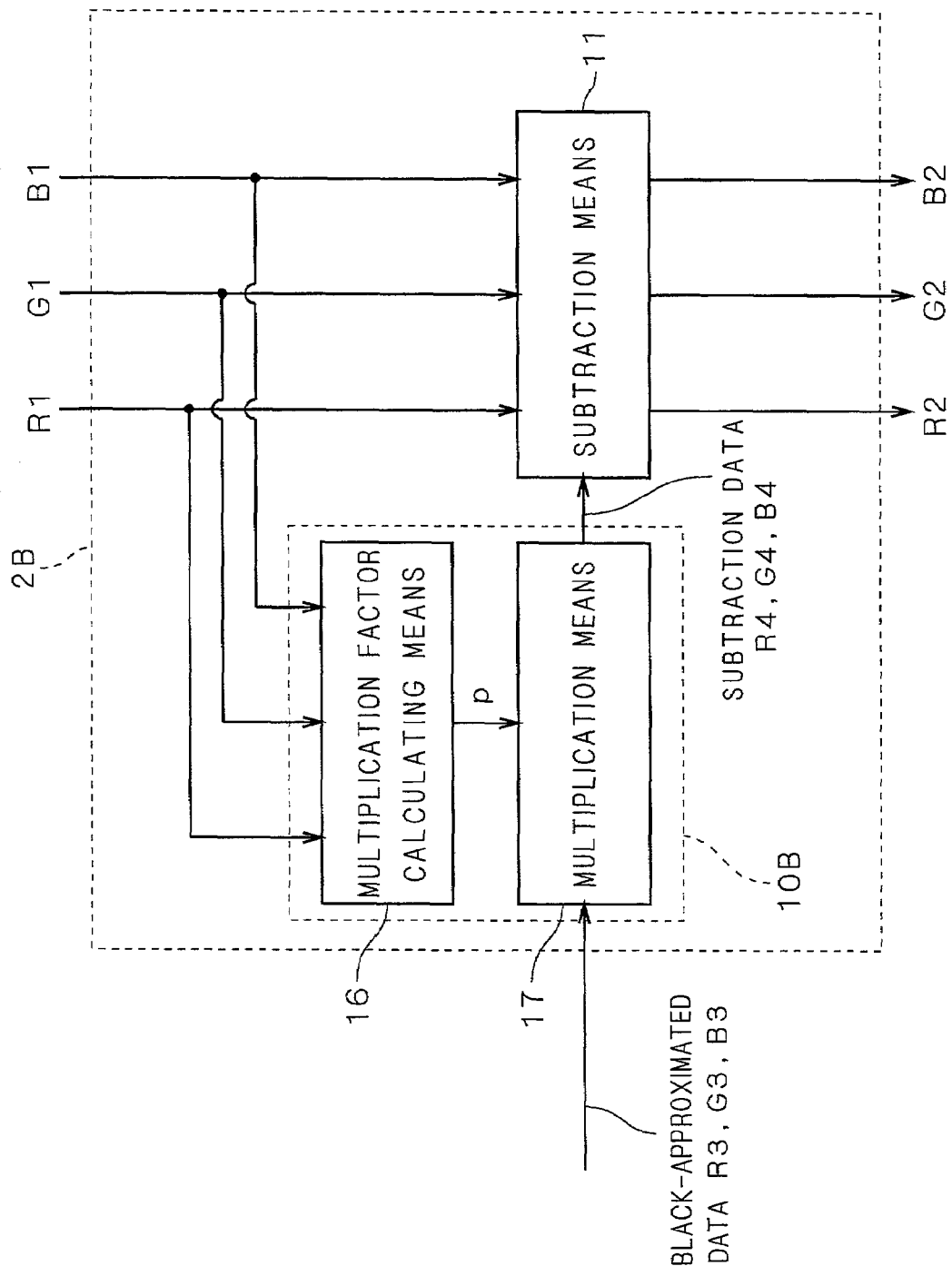
FIG. 9 is a block diagram illustrating a configuration of a black correction means in an image display device according to a second preferred embodiment.

FIG. 9 is a block diagram illustrating a configuration of a black correction means in an image display device according to a second preferred embodiment. Referring to FIG. 9, a black correction means 2B of this embodiment is made up of a subtraction data calculating means 10B (a multiplication factor calculating means 16, and a multiplication means 17) and a subtraction means 11. The subtraction means 11 is the same as that of the first preferred embodiment shown in FIG. 5. The overall configuration is the same as that of the first preferred embodiment shown in FIG. 1, except that the black correction means 2A is replaced with the black correction means 2B.

Like the first preferred embodiment, black-approximated data R3, G3 and B3 inputted to the black correction means 2B are then inputted to the subtraction data calculating means 10B in which subtraction data R4, G4 and B4 are calculated.

The subtraction data calculating means 10B is made up of the multiplication means 17 and the multiplication factor calculating means 16. The multiplication factor calculating means 16 receives the image data after input processing R1, G1, B1 and the black-approximated data R3, G3, B3. Based on these data, the subtraction data calculating means 16 calculates and outputs a multiplication factor p.

The multiplication means 17 receives the multiplication factor p from the multiplication factor calculating means 16 and the black-approximated data R3, G3, B3. Then the multiplication means 17 performs a multiplication processing in the following equation (19), to calculate subtraction data R4, G4, B4. The multiplication means 17 may be configured with hardware such as existing multiplier, or software.

$$R4 = p \cdot R3$$

$$G4 = p \cdot G3$$

$$B4 = p \cdot B3 \qquad (19)$$

The subtraction means 11 receives the image after input processing R1, G1, B1 and the subtraction data R4, G4, B4, and performs a subtraction processing in the following equation (20), to calculate and output black-corrected data R2, G2 and B2.

$$R2 = R1 - R4$$

$$G2 = G1 - G4$$

$$B2 = B1 - B4 \qquad (20)$$

FIG. 10 is a block diagram illustrating a configuration of the multiplication factor calculating means 16. As shown in FIG. 10, the multiplication factor calculating means 16 is made up of look-up tables 19a to 19c, and a minimum value selection means 21.

In the look-up table 19a, the image data after input processing R1 is used as an address, and the corresponding multiplication factor is stored in advance. Therefore, the look-up table 19a outputs a multiplication factor pr (<1) that corresponds to the value of the image data after input processing R1. The same is true for the look-up tables 19b and 19c. The look-up table 19b outputs a multiplication factor pg (<1) that corresponds to the value of the image data G1, and the look-up table 19c outputs a multiplication factor pb (<1) that corresponds to the value of the image data B1.

Referring to FIG. 10, the image data after input processing R1, G1 and B1 are inputted to the look-up tables 19a, 19b and 19c, from which outputted are multiplication factors pr, pg and pb that correspond to the image data R1, G1 and B1, respectively.

The multiplication factors pr, pg and pb from the look-up tables 19a, 19b and 19c, are then inputted to the minimum value selection means 21, from which outputted as a multiplication factor p is the minimum value in the multiplication factors pr, pg and pb. The minimum value selection means 21 may be configured with hardware or software.

In the image display device of the second preferred embodiment, as described above, the subtraction means 11 calculates black-corrected data R2, G2 and B2 by subtracting the subtraction data R4, G4 and B4 from the image data after input processing R1, G1 and B1. Theoretically, the subtraction data R4, G4 and B4 should be equal to black-approximated data R3, G3 and B3. However, the black-approximated data R3, G3 and B3 are values to be generated based on a black-display characteristic specifying data BD1, and these data do not change according to the values of the image data after input processing R1, G1 and B1. Therefore, in the case that the subtraction data R4, G4 and B4 are equal to the black-approximated data R3, G3 and B3, if the values of the image data after input processing R1, G1 and B1 are smaller than the black-approximated data R3, G3 and B3, a negative value will occur in black-corrected data.

For this, when the values of the image data after input processing R1, G1 and B1 are smaller than a predetermined value, factors pr, pg and pb, each being smaller than 1, are generated and multiplied with the black-approximated data to obtain subtraction data. Thereby, the subtraction data R4, G4 and B4, which are smaller than the black-approximated data R3, G3, B3, can be generated from the multiplication means 17, and it is avoided that a negative value occurs in the black-corrected data R2, G2 and B2. Thus, the multiplication factor calculating means 16 outputs the minimum value of the multiplication factors pr, pg and pb, as a multiplication factor p. It is therefore able to avoid the occurrence of a negative value in the black-corrected data R2, G2 and B2.

On the other hand, when the values of image data R1, G1 and B1 are larger than a predetermined value, black-approximated data R3, G3 and B3 are adopted as subtraction data R4, G4 and B4, respectively. Therefore, even under the influence of external light, a large proportion of data can be displayed at the same condition as under no influence of external light.

Accordingly, with the image display device of the second preferred embodiment, even under the influence of external light, a large proportion of data can be displayed at the same condition as under no influence of external light, by appropriately setting the above-mentioned predetermined value. This enables to provide an image having a large contrast and excellent visibility to the viewer.

Although the image display device of the first preferred embodiment suffers from a "black disarrangement" phenomenon that a luminance is kept constant in such a region that image data after input processing R1, G1 and B1 have a smaller value than black-approximated data R3, G3 and B3. Whereas in the image display device of the second preferred embodiment, the "black disarrangement" can be suppressed by allowing the look-up tables to store a suitable multiplication factor.

FIG. 11 is a graph showing a relationship between image data after input processing and black-corrected data. Consider now the case of storing, in the look-up table 19a, such a multiplication factor pr with which the image data after input processing R1 and black-corrected data R2 have the relationship shown in FIG. 11. In this case, R2 is expressed by the following equation (21).

$$R2 = R1 - R3 \quad \text{when } R1 \geq 2 \cdot R3 \qquad (21)$$

$$R2 = \frac{R1}{2} \quad \text{when } R1 < 2 \cdot R3$$

Since a subtraction data R4 is a difference between the black-corrected data R2 and the image data after input processing R1, it can be expressed by the following equation (22).

$$R4 = R3 \quad \text{when } R1 \geq 2 \cdot R3 \qquad (22)$$

$$R4 = \frac{R1}{2} \quad \text{when } R1 < 2 \cdot R3$$

The multiplication factor pr is a ratio of the subtraction data R4 to the black-approximated data R3, and it can be found from the following equation (23). Although the multiplication factor pr was described in the foregoing, the same is true for multiplication factors pg and pb.

$$pr = 1 \quad \text{when } R1 \geq 2 \cdot R3 \qquad (23)$$

-continued $$pr = \frac{R1}{2 \cdot R3} \text{ when } R1 < 2 \cdot R3$$

In the second preferred embodiment, the minimum value in the multiplication factors pr, pg and pb is selected as a multiplication factor p, in order to avoid the occurrence of a negative value in the black-corrected data R2, G2 and B2.

Like the first preferred embodiment, when the tristimulus values of a reflected light of external light on the surface of the image display means 3 are taken as X3=9.505, Y3=10, and Z3=10.89, black-approximated data should be R3=10, G3=10, and B3=10. Therefore, the influence of external light can be corrected most suitably when the black-approximated data are R3=10, G3=10, and B3=10, which the black-approximated data calculating means 4A has calculated based on the black-display characteristic specifying data BD1.

FIG. 12 is an explanatory diagram showing in the form of table the relationship between image data after input processing R1, G1, B1 and black-corrected data R2, G2, B2, and tristimulus values X3, Y3, Z3 of the color (light) entering the eyes of a viewer under the influence of external light in the image display device of the second preferred embodiment. Specifically, FIG. 12 shows the case that the relationship of R1=G1=B1 holds, i.e., that an achromatic data is inputted to the black correction means 2B.

In FIG. 12, in the tristimulus values of the color (light) entering the eyes of the viewer when R2, G2 and B2 are inputted to the image display means 3, the ratio of a Y3 corresponding to a luminance to a Y3 when R1=100, G1=100 and B1=100 (i.e., in displaying white) is indicated as a ratio to white (Y/Ymax).

As in the first preferred embodiment, the tristimulus values of a reflected light of external light on a predetermined screen of the image display means 3 are taken as X3=9.505, Y3=10, and Z3=10.89. At this time, black-approximated data results in that R3=10, G3=10, and B3=10.

With the image display device of the second preferred embodiment, when the image data after input processing R1, G1 and B1 have a value larger than twice black-approximated data R3, G3, B3 (R3=10, G3=10, B3=10), the same display as under no influence of external light is realized. In general, the black-approximated data R3, G3 and B3 usually have a small value, namely about one tenth that of the image data after input processing R1, G1 and B1. With the image display device of the second preferred embodiment, even under the influence of external light, a large proportion of data can be displayed at the same condition as under no influence of external light. This enables to provide an image having a large contrast and excellent visibility to the viewer.

The image display device of the first preferred embodiment suffers from the "black disarrangement" phenomenon that a luminance is kept constant in such a region that image data after input processing R1, G1 and B1 have a smaller value than black-approximated data R3, G3 and B3, whereas the image display device of the second preferred embodiment is free of the "black disarrangement" phenomenon because the subtraction data calculating means 10B calculates subtraction data R4, G4 and B4, based on the image data R1, G1 and B1. In the image display device of the second preferred embodiment, the range of the image data after input processing R1, G1 and B1 in which the same display as under no influence of external light is realized, depends on the contents of the multiplication factors pr, pg and pb to be stored in the look-up tables 19a, 19b and 19c.

FIG. 13 is a graph showing the relationship between image data after input processing R1, G1 and B1, and a luminance stimulus value Y3. In FIG. 13, a continuous line represents the image display device of the second preferred embodiment under the influence of external light, an alternate long and short dash line represents a conventional image display device under the influence of external light, and a dotted line represents the case having no influence of external light in both of this embodiment and the conventional device.

Third Preferred Embodiment

FIG. 14 is a block diagram illustrating a configuration of an image display device according to a third preferred embodiment. As shown in FIG. 14, an input image processing means 1, an image display means 3, a black-approximated data calculating means 4A and a black-display characteristic specifying means 5A are the same as that of the first preferred embodiment shown in FIG. 1. The third preferred embodiment is different from the first preferred embodiment in that a look-up table 9 and a table data writing means 22 are used in place of the black correction means 2A, as a black correction processing executing means. That is, a black correction part 52 is made up of the black-display characteristic specifying means 5A, black-approximated data calculating means 4A, look-up table 9 and table data writing means 22.

In the image display device of the third preferred embodiment, the processing in the black correction means 2A is realized by the look-up table 9.

The table data writing means 22 receives black-approximated data R3, G3 and B3 from the black-approximated data calculating means 4A and, based on these data R3, G3 and B3, previously calculates the values of data after black correction R2, G2 and B2, with respect to all combinations of data after input processing R1, G1 and B 1.

After calculating the data after black correction R2, G2 and B2, the table data writing means 22 writes to the look-up table 9 a table data TD in the form of table in which the values of the calculated black-corrected data R2, G2 and B2 are associated with the values of the data after input processing R1, G1 and B1, each being used as a write address. The black-corrected data R2, G2 and B2 with respect to the image data after input processing R1, G1 and B1 can be calculated by using the method described in the first preferred embodiment. The table data writing means 22 may be configured with hardware or software.

The calculation of the black-corrected data R2, G2 and B2 performed by the look-up table 9 is realized by reading out the written table data TD. To the look-up table 9, the image data after input processing R1, G1 and B1 from the input image processing means 1 are inputted as a read address, and the table data R2, G2 and B2 stored in the address are outputted as a black-corrected data.

Figure 15:
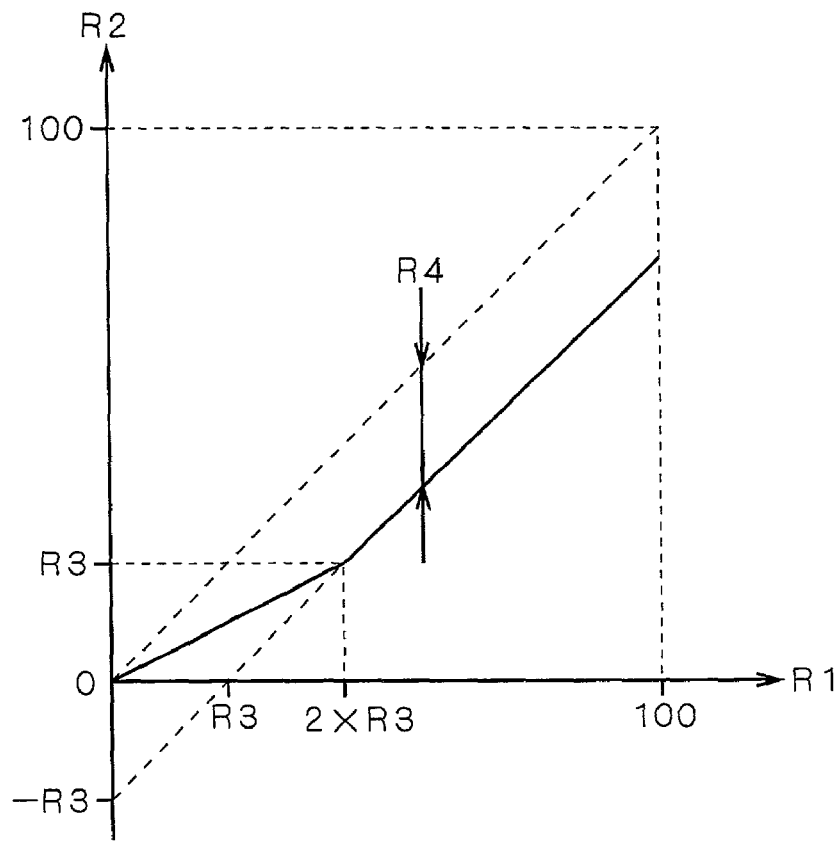
FIG. 15 is a diagram illustrating a relationship between data after input processing and black-corrected data.

FIG. 15 is a diagram illustrating a relationship between the data after input processing R1 and black-corrected data R2. As shown in FIG. 15, when the black-corrected data R2 depends only on the image data after input processing R1 and depends on neither the data after input processing G1 nor B1, the data R2 can be calculated from a one-dimensional look-up table using only the image data after input processing Ri as an address. Similarly, when the black-corrected data G2 depends only on the image data after input processing G1 and depends on neither the data after input processing R1 nor B1, the data G2 can be calculated from a one-dimensional look-up table using only the image data after input processing G1 as an address. Similarly, when the black-corrected data B2 depends only on the image data after input processing B1 and depends on neither the data after input processing R1 nor G1, the data B2 can be calculated from a one-dimensional look-up table using only the image data after input processing B1 as an address.

On the other hand, when each of the black-corrected data R2, G2 and B2 is a value that depends on a combination of the image data after input processing R1, G1 and B1, black-corrected data R2, G2 and B2 can be calculated from a three-dimensional look-up table using the image data after input processing R1, G1 and B1, as an address.

In the image display device of the third preferred embodiment, the processing of the black correction means 2A in the first or second preferred embodiment is realized by a look-up table, resulting in a simple circuit configuration. This is because the look-up table can be realized with memory of the type which reads the value of the black-corrected image data R2, G2 and B2, by using the image data R1, G1 and B1 as an address. Further, the use of the look-up table offers the following effects that the contents of the table can be set freely to increase the degree of freedom, and that the contents of the table can be rewritten to change the processing contents.

In addition, with the image display device of the third preferred embodiment, even under the influence of external light, a large proportion of data can be displayed at the same condition as under no influence of external light.

Fourth Preferred Embodiment

Figure 16:
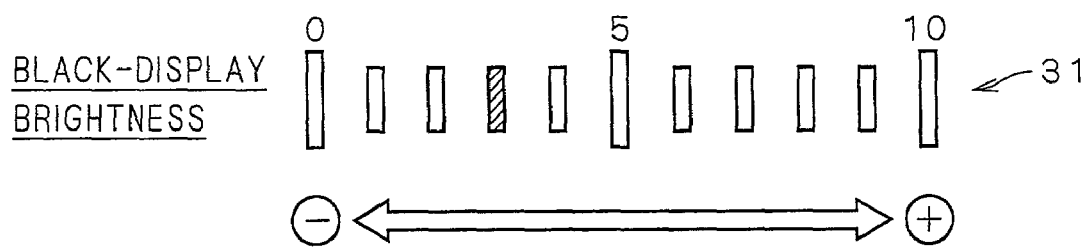
FIG. 16 is an explanatory diagram illustrating a menu of a black-display characteristic specifying means in an image display device according to a fourth preferred embodiment.

FIG. 16 is an explanatory diagram illustrating a menu of a black-display characteristic specifying means 5B to be displayed on a screen of an image display means 3 in an image display device according to a fourth preferred embodiment. As shown in FIG. 16, the brightness of a black display can be specified by a black-display brightness specifying bar 32. The configuration of this embodiment is the same as that of the first preferred embodiment, except that the black-display characteristic specifying means 5A and black-approximated data calculating means 4A are replaced with a black-display characteristic specifying means 5B and a black-approximated data calculating means 4B, respectively.

A viewer specifies a black-display characteristic by setting a value of the black-display brightness specifying bar 31 on the menu shown in FIG. 16. As a method of setting the value of the specifying bar 31, for example, the viewer operates a "+" key or "−" key of a remote controller. The specifying bar 31 informs the viewer of the set value by a change in the display color or display brightness. In the example of FIG. 16, the black-display brightness is set at the third step.

The black-display characteristic specifying means 5B generates a black-display characteristic specifying data from the value of the black-display brightness specifying bar 31 specified by the viewer. For example, the value of the specifying bar 31 can be used as a black-display characteristic specifying data. Therefore, in the example of FIG. 16, the black-display characteristic specifying means 5B outputs "3" as a black-display characteristic specifying data, to the black-approximated data calculating means 4B.

Figure 17:
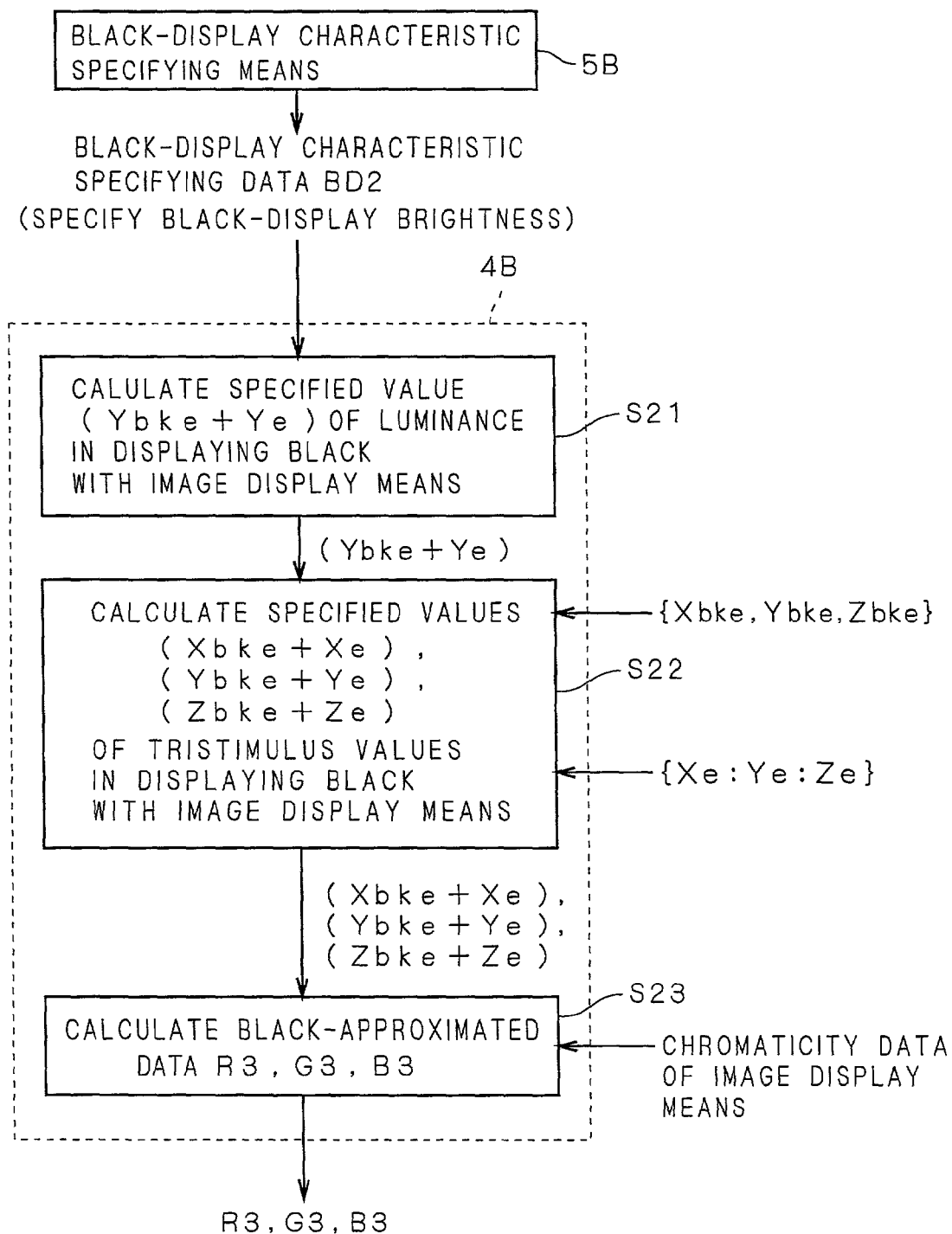
FIG. 17 is an explanatory diagram illustrating a flow of processing of calculating a black-approximated data in a black-approximated data calculating means of the fourth preferred embodiment.

FIG. 17 is an explanatory diagram illustrating a flow of a calculation processing of black-approximated data R3, G3 and B3 in the black-approximated data calculating means 4B. Referring to FIG. 17, description will be made of a calculation processing of black-approximated data R3, G3 and B3 in the black-approximated data calculating means 4B.

Firstly, in step S21, based on a predetermined reference, the image display means 3 calculates specified values of the luminance in displaying black (Ybke+Ye) from the value of a black-display characteristic specifying data BD2.

In the specified values of the luminance in displaying black with the image display means 3, "Ybke" is a component of the luminance in displaying black with the image display means 3 under no influence of external light. The luminance in displaying black with the image display means 3 under no influence of external light, depends on the characteristic of the image display means 3. For instance, when a liquid crystal display is used as an image display means 3, the transmittance of liquid is changed by changing the amount of transmittance of the light from a light source, thereby performing an image display. Even in displaying black, it is impossible to completely block the light from the light source, therefore, the luminance in displaying black with the image display means 3 under no influence of external light, has usually a value not "0". In the specified values of the luminance in displaying black with the image display means 3, "Ye" is a component of the luminance of the external light reflected from the image display means 3. Therefore, (Ybke+Ye) becomes a specified value of the luminance in displaying black with the image display means 3, taking the influence of external light into consideration.

Figures 18, 19:
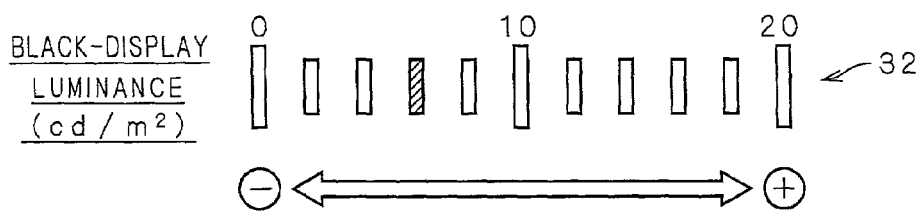
FIG. 18 is an explanatory diagram showing in the form of table the relationship between a black-display characteristic specifying data and a specified value of a luminance in displaying black.
FIG. 19 is an explanatory diagram illustrating a menu of a black-display characteristic specifying means in an image display device according to a fifth preferred embodiment.

FIG. 18 is an explanatory diagram showing in the form of table the relationship between the black-display characteristic specifying data BD2 and specified values (Ybke+Ye) of the luminance in displaying black. In executing step S11, the relationship shown in FIG. 18 can be used, for example.

In step S22, the specified values (Xbke+Xe), (Ybke+Ye) and (Zbke+Ze) of the tristimulus values in displaying black with the image display means 3 are calculated based on the specified value (Ybke+Ye).

Referring to FIG. 18, the black-approximated data calculating means 4B holds in advance the tristimulus values (Xbke, Ybke, Zbke) in displaying black under no influence of external light, and the ratio (Xe:Ye:Ze) of the tristimulus values in displaying black with the image display means 3. From the ratio (Xe:Ye:Ze), the tristimulus values (Xbke, Ybke, Zbke), and the specified value of the luminance obtained in step S21, the black-approximated data calculating means 4B calculates the specified values (Xbke+Xe), (Ybke+Ye) and (Zbke+Ze) in displaying black with the image display means 3.

Like "Ybke", "Xbke" and "Zbke" are components of the tristimulus values in displaying black with the image display means 3 under no influence of external light, in the specified values of tristimulus values in displaying black with the image display means 3. Also, like "Ye", "Xe" and "Ze" are components of the tristimulus values of the external light reflected from the image display means 3, in the specified values of the tristimulus values in displaying black with the image display means 3. Therefore, like (Ybke+Ye), (Xbke+Xe) and (Zbke+Ze) become specified values of the tristimulus values in displaying black with the image display means 3, taking the influence of external light into consideration.

The tristimulus values (Xbke+Xe), (Ybke+Ye) and (Zbke+Ze) in displaying black, which are held in the black-approximated data calculating means 4B, can be stored by dividing them into the tristimulus values Xbke, Ybke and Zbke in displaying black under no influence of external light, and the ratio Xe:Ye:Ze of the tristimulus values of a reflected light of external light. The tristimulus values Xbke, Ybke and Zbke in displaying black under no influence of external light can be measured previously, for example, when manufacturing the image display device. The ratio of tristimulus values of a reflected light of external light can also be a value previously measured in the environment in which the image display device is used. If such environment is unaware in advance, a representative ratio of tristimulus values of a light source may be used. For instance, if it is assumed that a spectral distribution of a reflected light of external light is the same as that of $D_{65}$ that is a standard light source, X3:Ye:Ze=0.9505:1:1.089.

Consider now the case that a luminance (Ybke+Ye) in displaying black with the image display means 3 is specified as being 30 cd/(m$^2$) and, among the stored tristimulus values in displaying black under no influence of external light, Ybke is 10 cd/(m$^2$). In this case, Ye=20 cd/(m$^2$) is obtained, and Xe and Ze are found from the stored ratio Xe:Ye:Ze of the tristimulus values of a reflected light of external light. Further, (Xbke+Xe), (Ybke+Ye) and (Zbke+Ze) can be found by using the tristimulus values Xbke and Zbke in displaying black under no influence of external light, which are stored in the black-approximated data calculating means 4B.

In the case that Xe and Ze are found from the luminance Ye of a reflected light of external light by assuming a spectrum distribution of the reflected light of external light, a difference between the actual spectrum distribution of external light and the assumed spectrum distribution results in a difference in the chromaticity of the color displayed on the image display means 3 by black-corrected data.

In step S23, black-approximated data R3, G3 and B3 are calculated based on the tristimulus values (Xbke+Xe), (Ybke+Ye) and (Zbke+Ze) in displaying black with the image display means 3. This calculation method will be described below.

Like the first preferred embodiment, tristimulus values X3, Y3 and Z3 of the light entering the eyes of a viewer of the image display device under the influence of external light are expressed by the sum of the tristimulus values X1, Y1 and Z1 of the color displayed on the image display means 3 by black-corrected data R2, G2, B2, and the tristimulus values X2, Y2, Z2 of a reflected light. That is, X3, Y3 and Z3 are expressed by the following equation (24).

$$\begin{bmatrix} X3 \\ Y3 \\ Z3 \end{bmatrix} = \begin{bmatrix} axr & axg & axb \\ ayr & ayg & ayb \\ azr & azg & azb \end{bmatrix} \begin{bmatrix} R2 \\ G2 \\ B2 \end{bmatrix} + \begin{bmatrix} Xbk1 + X2 \\ Ybk1 + Y2 \\ Zbk1 + Z2 \end{bmatrix} \quad (24)$$

In equation (24), axr, ayr, azr, axg, ayg, azg, axb, ayb, azb, and Xbk1, Ybk1, Zbk1, are values that depend on the characteristic of the image display means 3. Although the tristimulus values Xbk1, Ybk1 and Zbk1 in displaying black under no influence of external light, that is, when R2=G2=B2=0, have in fact a value larger than "0", all of these values should theoretically be "0", and a smaller value is more desirable.

From equation (24), taking the influence of external light into consideration, the tristimulus values in displaying black on the image display means 3 are (Xbk1+X2), (Ybk1+Y2), and (Zbk1+Z2). Based on the tristimulus values thus obtained, black-approximated data R3, G3 and B3 can be obtained from the following equation (25).

$$\begin{bmatrix} R3 \\ G3 \\ B3 \end{bmatrix} = \begin{bmatrix} axr & axg & axb \\ ayr & ayg & ayb \\ azr & azg & azb \end{bmatrix}^{-1} \begin{bmatrix} Xbk1 + X2 \\ Ybk1 + Y2 \\ Zbk1 + Z2 \end{bmatrix} \quad (25)$$

In calculating black-approximated data R3, G3 and B3 in the fourth preferred embodiment, the specified values (Xbke+Xe), (Ybke+Ye) and (Zbke+Ze) of the tristimulus values in displaying black are used instead of the tristimulus values (Xbk1+X2), (Ybk1+Y2) and (Zbk1+Z2) in displaying black with the image display means 3, taking the influence of external light into consideration. In this case, the black-approximated data R3, G3 and B3 are found from the following equation (26), which is obtained by replacing (Xbk1+X2), (Ybk1+Y2) and (Zbk1+Z2) in equation (25) with (Xbke+Xe), (Ybke+Ye) and (Zbke+Ze), respectively.

$$\begin{bmatrix} R3 \\ G3 \\ B3 \end{bmatrix} = \begin{bmatrix} axr & axg & axb \\ ayr & ayg & ayb \\ azr & azg & azb \end{bmatrix}^{-1} \begin{bmatrix} Xbke + Xe \\ Ybke + Ye \\ Zbke + Ze \end{bmatrix} \quad (26)$$

Tristimulus values X31, Y31 and Z31 of the color displayed when black-approximated data R3, G3 and B3 are inputted to the image display means 3, are X3, Y3 and Z3 that are found from equation (24) where R2=R3, G2=G3, and B2=B3. From equations (24) and (26), the following equation (27) is obtained.

$$\begin{bmatrix} X31 \\ Y31 \\ Z31 \end{bmatrix} = \begin{bmatrix} Xbke + Xe \\ Ybke + Ye \\ Zbke + Ze \end{bmatrix} + \begin{bmatrix} Xbk1 + X2 \\ Ybk1 + Y2 \\ Zbk1 + Z2 \end{bmatrix} \quad (27)$$

Tristimulus values X30, Y30 and Z30 in displaying black with the image display means 3 are found from equation (24) where R2=0, G2=0, B2=0, and are expressed by the following equation (28).

$$\begin{bmatrix} X30 \\ Y30 \\ Z30 \end{bmatrix} = \begin{bmatrix} Xbk1 + X2 \\ Ybk1 + Y2 \\ Zbk1 + Z2 \end{bmatrix} \quad (28)$$

From equations (27) and (28), a difference between the tristimulus values, X31, Y31, Z31 of the color displayed when the black-approximated data R3, G3 and B3 are inputted to the image display means 3, and the tristimulus values X30, Y30 and Z30 in displaying black with the image display means 3, become specified values (Xbke+Xe), (Ybke+Ye) and (Zbke+Ze) of the tristimulus values in displaying black with the image display means 3 under the influence of external light. As concerns only a luminance component Y (e.g., Y30 and Y31) of tristimulus values, the above-mentioned relationship holds again in luminance.

The effects of the image display device of the fourth preferred embodiment will be described. In this embodiment, the configuration of the black correction means 2A is the same as that of the first preferred embodiment. Therefore, from the following equation (29), subtraction data R4, G4 and B4 are found from the black-approximated data R3, G3 and B3.

R4=R3

G4=G3

B4=B3 (29)

From the following equation (30), black-corrected data R2, G2 and B2 are found from data after input processing R1, G1, B1 and subtraction data R4, G4, B4.

R2=R1−R4 when R1>R4

R2=0 when R1≦R4

G2=G1−G4 when G1>G4

G2=0 when G1≦G4

B2=B1−B4 when B1>B4

B2=0 when B1≦B4 (30)

From equations (29) and (30), the following equation (31) is obtained.

R2=R1−R3 when R1>R3

R2=0 when R1≦R3

G2=G1−G3 when G1>G3

G2=0 when G≦G3

B2=B1−B3 when B1>B3

B2=0 when B1≦B3 (31)

Tristimulus values X3, Y3 and Z3 of the light entering the eyes of a viewer of the image display device under the influence of external light, are expressed by equation (24), and black-approximated data R3, G3 and B3 are expressed by equation (26). Therefore, from equations (24), (26) and (31), the following equation (32) holds when R1>R3 and G1>G3 and B1>B3.

$$\begin{bmatrix} X3 \\ Y3 \\ Z3 \end{bmatrix} = \begin{bmatrix} axr & axg & axb \\ ayr & ayg & ayb \\ azr & azg & azb \end{bmatrix} \begin{bmatrix} R1-R3 \\ G1-G3 \\ B1-B3 \end{bmatrix} + \begin{bmatrix} Xbk1+X2 \\ Ybk1+Y2 \\ Zbk1+Z2 \end{bmatrix}$$

$$= \begin{bmatrix} axr & axg & axb \\ ayr & ayg & ayb \\ azr & azg & azb \end{bmatrix} \begin{bmatrix} R1 \\ G1 \\ B1 \end{bmatrix} - \begin{bmatrix} axr & axg & axb \\ ayr & ayg & ayb \\ azr & azg & azb \end{bmatrix} \begin{bmatrix} R3 \\ G3 \\ B3 \end{bmatrix} + \begin{bmatrix} Xbk1+X2 \\ Ybk1+Y2 \\ Zbk1+Z2 \end{bmatrix}$$

$$= \begin{bmatrix} axr & axg & axb \\ ayr & ayg & ayb \\ azr & azg & azb \end{bmatrix} \begin{bmatrix} R1 \\ G1 \\ B1 \end{bmatrix} - \begin{bmatrix} Xbke+Xe \\ Ybke+Ye \\ Zbke+Ze \end{bmatrix} + \begin{bmatrix} Xbk1+X2 \\ Ybk1+Y2 \\ Zbk1+Z2 \end{bmatrix}$$

(32)

When tristimulus values (Xbk1+X2), (Ybk1+Y2) and (Zbk1+Z2) in displaying black with the image display means 3, taking the influence of external light into consideration, is equal to tristimulus values (Xbke+Xe), (Ybke+Ye) and (Zbke+Ze) in displaying black specified by the viewer, the tristimulus values X3, Y3 and Z3 of the light entering the eyes of the viewer of the image display device are expressed by the following equation (33).

$$\begin{bmatrix} X3 \\ Y3 \\ Z3 \end{bmatrix} = \begin{bmatrix} axr & axg & axb \\ ayr & ayg & ayb \\ azr & azg & azb \end{bmatrix} \begin{bmatrix} R1 \\ G1 \\ B1 \end{bmatrix}$$ (33)

That is, with the image display device of the fourth preferred embodiment, the viewer can specify a black-display characteristic specifying data BD2 by using the black-display characteristic specifying means 5B. Then, when data after input processing R1, G1 and B1 have a value larger than R3, G3 and B3, the device is free of the influence of external light and realizes the same display as in a virtual image display device assuming Xbk1=Ybk1=Zbk1=0. In general, the black-approximated data R3, G3 and B3 have a smaller value than the data after input processing R1, G1 and B1. With the image display device of this embodiment, the viewer specifies a brightness in displaying black as a black-display characteristic specifying data BD2, by using the black-display characteristic specifying means 5B. Thereby, even if the tristimulus values in displaying black are large due to both the influence of external light and the characteristic of the image display means, a large proportion of data can be displayed at the same condition as the case that the tristimulus values (including a luminance component) in displaying black are "0". This enables to provide an image having a large contrast and excellent visibility to the viewer.

In addition, since the viewer can specify a black-display characteristic with a brightness in displaying black, no special knowledge and experience for specifying a black-display characteristic is needed, thus making it easy to specify the black-display characteristic.

Fifth Preferred Embodiment

In the fourth preferred embodiment, the menu of the black-display characteristic specifying means 5B is configured such that the viewer specifies a black-display characteristic by a brightness in displaying black. A fifth preferred embodiment is characterized in that a black-display characteristic is specified by a luminance in displaying black.

FIG. 19 is an explanatory diagram illustrating a menu of a black-display characteristic specifying means 5C to be displayed on a screen of an image display means 3 in an image display device according to a fifth preferred embodiment. Referring to FIG. 19, a luminance in displaying black can be specified by operating a black-display luminance specifying bar 32. Except for the black-display characteristic specifying means 5C and a black-approximated data calculating means 4C, the configuration of the fifth preferred embodiment is the same as that of the fourth preferred embodiment.

A viewer specifies a black-display characteristic by setting a value of the black-display luminance specifying bar 32 on the menu shown in FIG. 19. As a method of setting the value of the specifying bar 32, for example, the viewer operates a "+" key or "−" key of a remote controller. The specifying bar 32 informs the viewer of the set value by a change in the display color or display brightness. In the example of FIG. 19, the black-display luminance is set to 30 cd/(m$^2$).

The black-display characteristic specifying means 5C generates a black-display characteristic specifying data BD3 from the value of the black-display brightness specifying bar 32 specified by the viewer. For example, the value of the specifying bar 32 can be employed as a black-display characteristic specifying data BD3. Therefore, the black-display characteristic specifying means 5C outputs "30" as a black-display characteristic specifying data BD3, to the black-approximated data calculating means 4C.

The black-approximated data calculating means 4C receives the black-display characteristic specifying data BD3 from the black-display characteristic specifying means 5C, and the calculating means 4C calculates and outputs black-corrected image data R2, G2 and B2. In the fourth preferred embodiment, a specified value of the luminance in displaying black with the image display means 3 is previously calculated from the black-display specifying data BD2 in the black-approximated data calculating means 4B. Whereas in the fifth preferred embodiment, it is configured that a viewer specifies a luminance itself in displaying black, as a characteristic specifying data BD3. That is, the value of the black-display characteristic specifying data BD3 in the black-display characteristic specifying means 5C is directly used as a specified value (Ybke+Ye) of the luminance in displaying black with the image display means 3.

Figure 20:
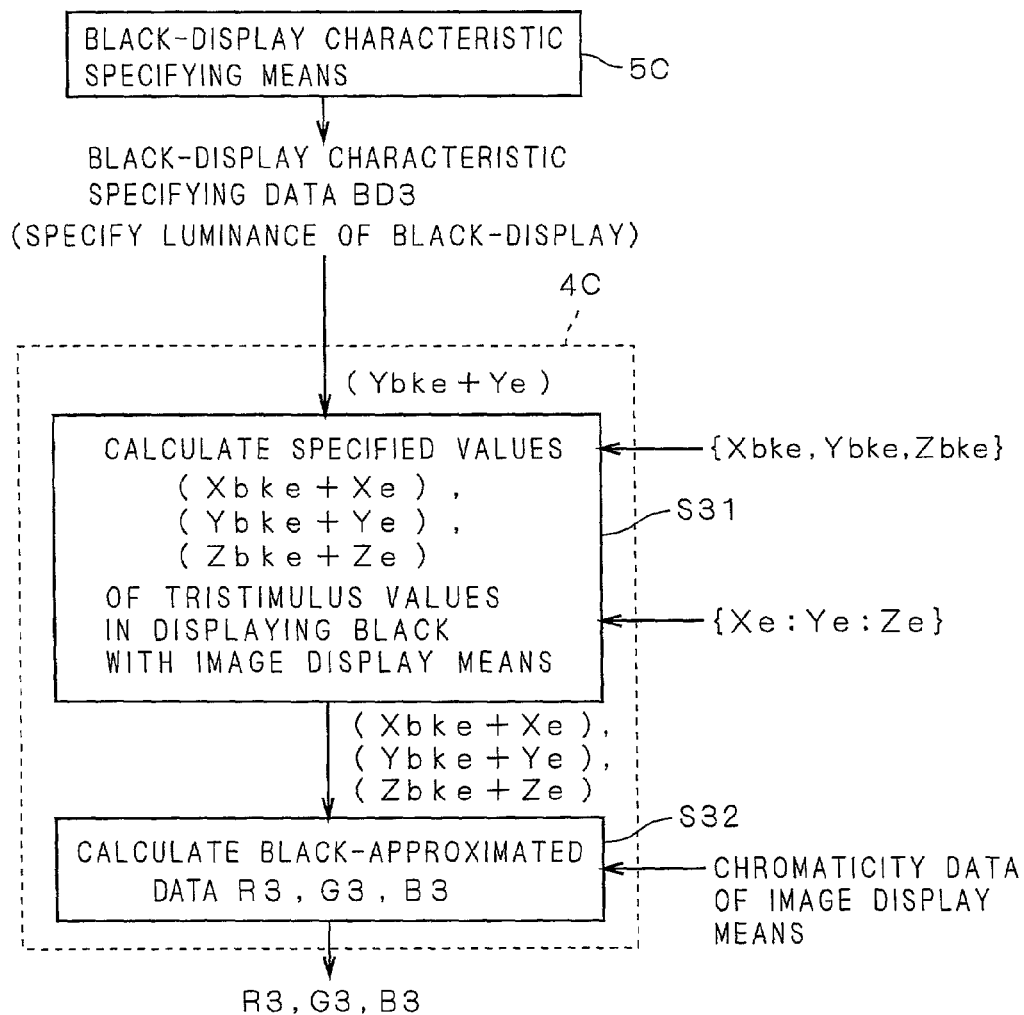
FIG. 20 is an explanatory diagram illustrating a flow of processing of calculating a black-approximated data in a black-approximated data calculating means of the fifth preferred embodiment.

FIG. 20 is an explanatory diagram illustrating a flow of a calculation processing of black-approximated data R3, G3 and B3 in the black-approximated data calculating means 4C. Referring to FIG. 20, description will be made of a calculation processing of black-approximated data R3, G3 and B3 in the black-approximated data calculating means 4C.

Firstly, in step S31, based on a specified value (Ybke+Ye) of the luminance in displaying black that is specified by a black-display characteristic specifying data BD3, specified values (Xbke+Xe), (Ybke+Ye) and (Zbke+Ze) of the tristimulus values in displaying black with the image display means 3 are calculated in the same manner as the processing of step S22 in the fourth preferred embodiment shown in FIG. 17.

In step S32, based on the mentioned specified values (Xbke+Xe), (Ybke+Ye) and (Zbke+Ze), black-approximated data R3, G3 and B3 are calculated in the same manner as the processing of step S23 in the fourth preferred embodiment shown in FIG. 17.

With the image display device of the fifth preferred embodiment, since the viewer specifies a black-display characteristic with a luminance in displaying black, it is able to omit the processing of calculating the luminance in displaying black in the image display device (which corresponds to the processing of step S21 in FIG. 17), and also avoid a difference between a luminance obtained in calculating the luminance in displaying black and a luminance that the viewer desires. For instance, if the viewer can obtain the correct luminance in displaying black with the image display device by using existing measuring method, the obtained luminance value can be set directly.

Sixth Preferred Embodiment

In the first preferred embodiment, the menu of the black-display characteristic specifying means 5A is configured such that a viewer specifies a black-display characteristic by a brightness of a reflected light of external light. A sixth preferred embodiment is characterized in that the menu of a black-display characteristic specifying means 5D is configured such that a black-display characteristic is specified by a luminance of a reflected light of external light.

Figure 21:
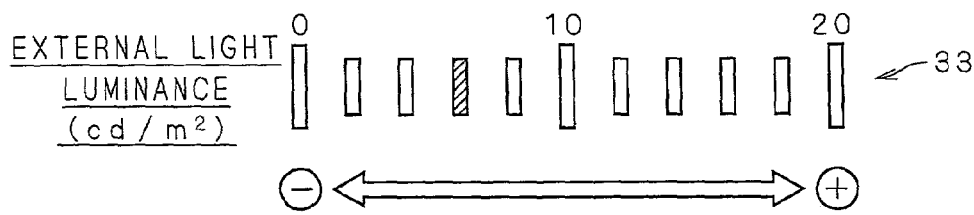
FIG. 21 is an explanatory diagram illustrating a menu of a black-display characteristic specifying means in an image display device according to a sixth preferred embodiment.

FIG. 21 is an explanatory diagram illustrating a menu of the black-display characteristic specifying means 5D to be displayed on a screen of an image display means 3 in an image display device according to the sixth preferred embodiment. Referring to FIG. 21, the luminance of a reflected light of external light can be specified by operating an external-light luminance specifying bar 33. Except for the black-display characteristic specifying means 5D and a black-approximated data calculating means 4D, the configuration of the sixth preferred embodiment is the same as that of the first preferred embodiment.

The viewer specifies a black-display characteristic by setting a value of the external-light luminance specifying bar 33 on the menu shown in FIG. 21. As a method of setting the value of the specifying bar 33, for example, the viewer operates a "+" key or "−" key of a remote controller. The specifying bar 33 informs the viewer of the set value by a change in the display color or display brightness. In the example of FIG. 21, the luminance of the reflected light of external light is set to 30 cd/(m$^2$).

The black-display characteristic specifying means 5D generates a black-display characteristic specifying data BD4 from the value of the external-light luminance specifying bar 33, which has been specified by the viewer. For example, the value of the specifying bar 33 can be employed as a black-display characteristic specifying data BD4. Therefore, the black-display characteristic specifying means 5D outputs "30" as a black-display characteristic specifying data BD4, to the black-approximated data calculating means 4D.

The black-approximated data calculating means 4D receives the black-display characteristic specifying data BD4 from the black-display characteristic specifying means 5D, and the calculating means 4D calculates and outputs black-approximated data R3, G3 and B3. In the first preferred embodiment, based on a predetermined reference, the black-approximated data calculating means 4A calculates a specified value of the luminance of a reflected light of external light in the image display means 3, from a black-display specifying data. Whereas in the sixth preferred embodiment, it is configured such that a viewer specifies a luminance of a reflected light of external light, and the value of the black-display characteristic specifying data BD4 is directly used as a specified value Ye of the luminance of the reflected light of external light in the image display means 3.

Figure 22:
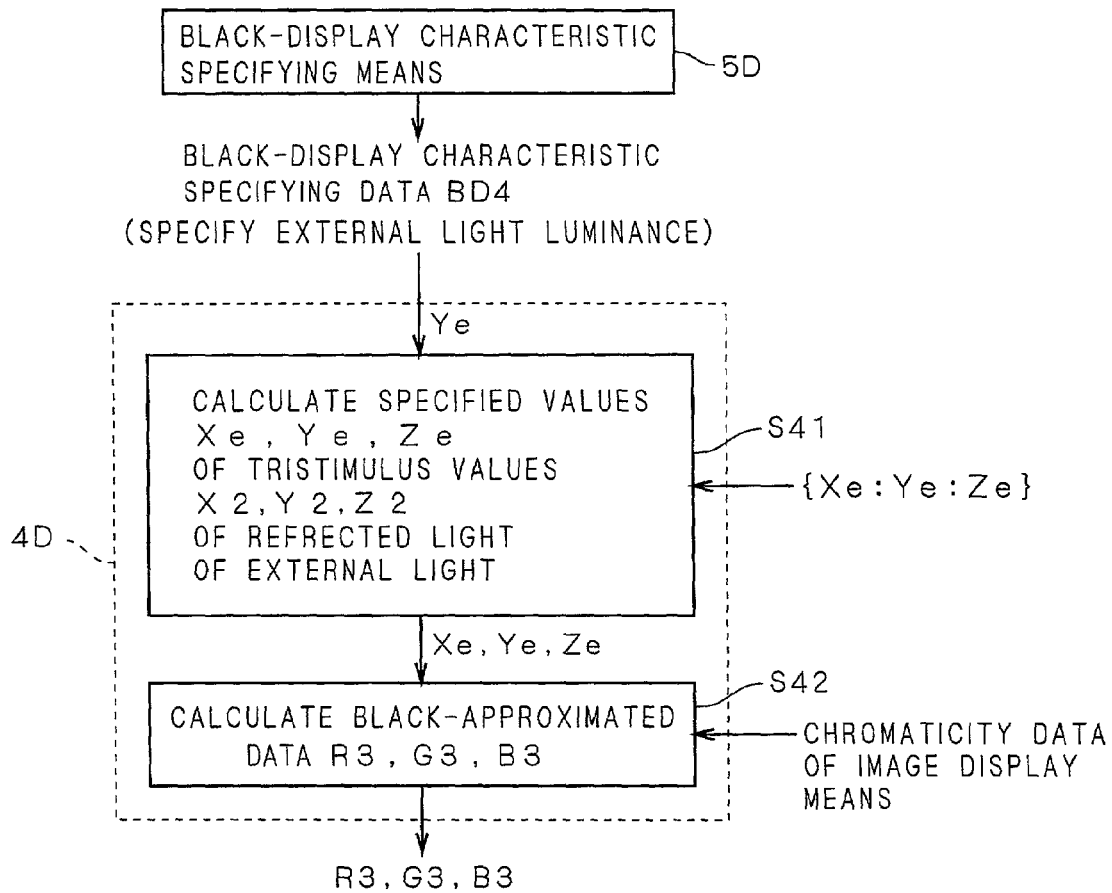
FIG. 22 is an explanatory diagram illustrating a flow of processing of calculating a black-approximated data in a black-approximated data calculating means of the sixth preferred embodiment.

FIG. 22 is an explanatory diagram illustrating a flow of a calculation processing of black-approximated data R3, G3 and B3 in the black-approximated data calculating means 4D. Referring to FIG. 22, description will be made of a calculation processing of black-approximated data R3, G3 and B3 in the black-approximated data calculating means 4D.

Firstly, in step S41, based on a specified value Ye of the luminance of a reflected light of external light which is specified by a black-display characteristic specifying data BD4, specified values Xe, Ye, Ze of the tristimulus values of a reflected light of external light in the image display means 3 are calculated in the same manner as the processing of step S12 in the first preferred embodiment shown in FIG. 3. In step S42, black-approximated data R3, G3 and B3 are calculated in the same manner as the processing of step S13 in the first preferred embodiment shown in FIG. 3.

With the image display device of the sixth preferred embodiment, since the viewer specifies a black-display characteristic with a luminance of a reflected light of external light, it is able to omit the processing of calculating the luminance of a reflected light of external light in the image display device (which corresponds to the processing of step S11 in FIG. 3), and also avoid a difference between a luminance obtained in calculating the luminance of the reflected light of external light and a luminance that the viewer desires. For instance, if the viewer can obtain the correct luminance of the reflected light of external light in the image display device by using existing measuring method, the obtained luminance value can be set directly.

Seventh Preferred Embodiment

In the first preferred embodiment, the menu of the black-display characteristic specifying means 5A is configured such that a viewer specifies a black-display characteristic by a brightness of a reflected light of external light. A seventh preferred embodiment is characterized in that the menu of a black-display characteristic specifying means 5E is configured such that the kind of an external light is also used in specifying a black-display characteristic.

Figure 23:
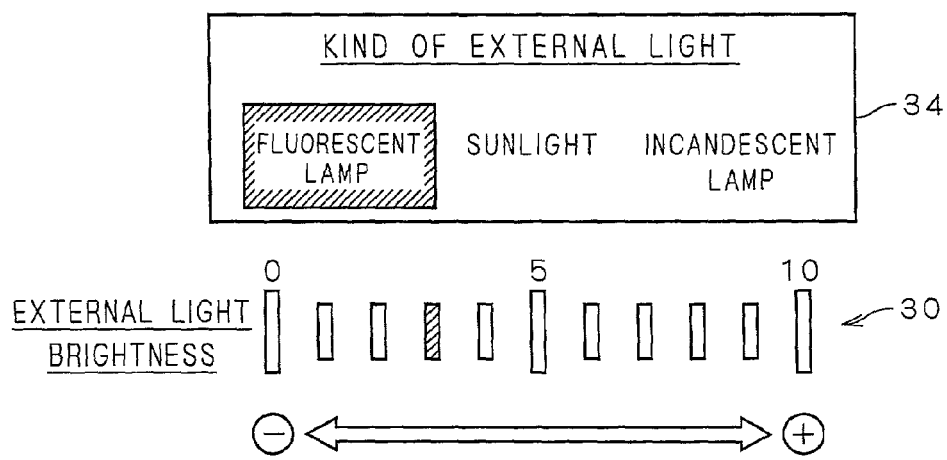
FIG. 23 is an explanatory diagram illustrating a menu of a black-display characteristic specifying means in an image display device according to a seventh preferred embodiment.

FIG. 23 is an explanatory diagram illustrating a menu of the black-display characteristic specifying means 5E to be displayed on a screen of an image display means 3 in an image display device according to the seventh preferred embodiment. Referring to FIG. 23, the brightness of an external light can be specified by operating an external-light brightness specifying bar 30, and the kind of the external light can be specified by operating an external-light kind specifying menu 34. Except for a black-display characteristic specifying means 5A and a black-approximated data calculating means 4E, the configuration of the seventh preferred embodiment is the same as that of the first preferred embodiment.

A viewer specifies, on the menu shown in FIG. 23, a black-display characteristic by specifying the kind of an external light with the external-light kind specifying menu 34 and setting a value of the external-light brightness specifying bar 30. As a method of setting the values of the external-light kind specifying menu 34 and external light brightness specifying bar 30, the viewer operates, for example, a "+" key or "−" key of a remote controller. The external light kind specifying menu 34 and external light brightness specifying bar 30 inform the viewer of the set value by a change in the display color or display brightness. In the example of FIG. 23, the specified kind of the reflected light of the external light and the specified brightness of the external light are "fluorescent lamp" and "3", respectively.

The black-display characteristic specifying means 5E generates a black-display characteristic specifying data BD5 from the kind and value specified by the viewer through the external light kind specifying menu 34 and external light brightness specifying bar 30. For example, the sum of the value determined by the kind of an external light and the value of the external-light brightness specifying bar 30, each being specified by the viewer, can be used as a black-display characteristic specifying data BD5. Examples of the values determined according to the kind of an external light are: "100" for fluorescent lamp; "200" for sunlight; and "300" for incandescent lamp. Thus in the example of FIG. 23, the black-display characteristic specifying means 5E outputs "103" as a black-display characteristic specifying data BD5, to the black-approximated data calculating means 4E.

The black-approximated data calculating means 4E receives the black-display characteristic specifying data BD5 from the black-display characteristic specifying means 5E, and calculates and outputs black-corrected image data R2, G2 and B2.

Figure 24:
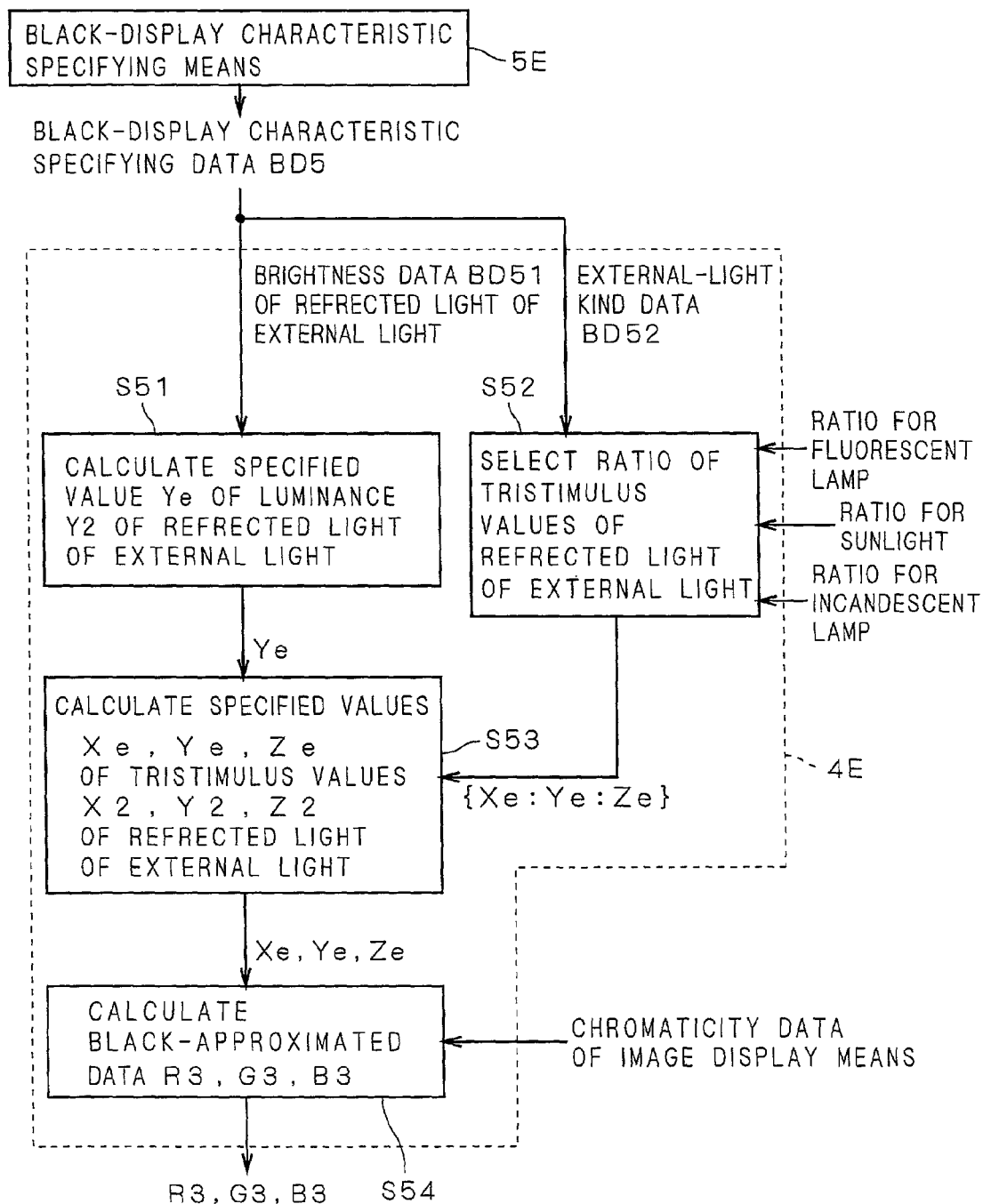
FIG. 24 is an explanatory diagram illustrating a flow of processing of calculating a black-approximated data in a black-approximated data calculating means of the seventh preferred embodiment.

FIG. 24 is an explanatory diagram illustrating a flow of a calculation processing of black-approximated data R3, G3 and B3 in the black-approximated data calculating means 4E. Referring to FIG. 24, description will be made of a calculation processing of black-approximated data R3, G3 and B3 in the black-approximated data calculating means 4E.

Firstly, in step S51, of the black-display characteristic specifying data BD5, by using a reflected light of external-light brightness data BD51 set by the external-light brightness specifying bar 30, a specified value Ye of the reflected light of external light on the image display means 3 is calculated based on a predetermined reference. The calculation of the specified value Ye can be performed in the same manner as the processing of step S 1 in the first preferred embodiment shown in FIG. 3.

In step S52, in parallel with the processing of step S51, a ratio Xe:Ye:Ze of tristimulus values of a reflected light of external light is selected based on an external-light kind data BD52, set on the external light kind specifying menu 34, in the black-display characteristic specifying data BD5.

The black-approximated data calculating means 4E holds in advance, per external light kind, a plurality of ratios of tristimulus values of the external light reflected from the image display means 3 (i.e., the respective ratios of the tristimulus values if the external light is a fluorescent lamp, sunlight or incandescent lamp). Thereby an appropriate ratio of tristimulus values can be selected according to the kind of an external light specified by the external light kind data BD52. For instance, if the data BD52 indicates the fluorescent lamp, there is selected a ratio of tristimulus values when the fluorescent lamp is reflected as an external light.

In step S53, by using the specified value Ye and the ratio Xe:Ye:Ze of tristimulus values selected in step S52, Xe, Ye and Ze, which the viewer specifies with respect to the tristimulus values of the external light reflected from the image display means 3, are calculated in the same manner as the processing of step S12 in the first preferred embodiment shown in FIG. 3. The ratios of tristimulus values of the reflected light of external light which are held in the black-approximated data calculating means 4E may be predetermined values measured in advance when the external light is the fluorescent lamp, sunlight or incandescent lamp. Alternatively, the ratios of tristimulus values calculated from typical spectral distributions of the fluorescent lamp, sunlight or incandescent lamp may be used.

In step S54, in the same manner as the processing of step S13 in the first preferred embodiment shown in FIG. 3, black-approximated data R3, G3 and B3 are calculated from the specified values Xe, Ye and Ze of the tristimulus values of a reflected light of external light in the image display means 3.

With the image display device of the seventh preferred embodiment, since the viewer specifies a black-display characteristic with the kind of an external light and the brightness of the external light, the viewer can select a proper kind of the external light according to the environment in which the image display device is used. This increases the degree of freedom than the case that the kind of an external light is fixed, thus increasing the accuracy of correction of the influence of external light. In addition, no special knowledge for specifying a black-display characteristic is needed, thereby making it easy to select the kind of an external light.

Eighth Preferred Embodiment

In the seventh preferred embodiment, the menu of the black-display characteristic specifying means 5E is configured such that a viewer specifies a black-display characteristic by the kind of an external light and the brightness of the external light. An eighth preferred embodiment is characterized in that the menu of a black-display characteristic specifying means 5F is configured such that a black-display characteristic is specified by using a color temperature of an external light in place of the kind of the external light.

FIG. 25 is an explanatory diagram illustrating a menu of the black-display characteristic specifying means 5F to be displayed on a screen of an image display means 3 in an image display device according to the eighth preferred embodiment. Referring to FIG. 25, the brightness of an external light can be specified by operating an external-light brightness specifying bar 30, and the color temperature of the external light can be specified by operating an external-light color temperature specifying bar 35. Except for the black-display characteristic specifying means 5F and a black-approximated data calculating means 4F, the configuration of the eighth preferred embodiment is the same as that of the first preferred embodiment.

A viewer specifies, on the menu shown in FIG. 25, a black-display characteristic specifying data BD6, by specifying a color temperature of an external light by the external-light color temperature specifying bar 35 and specifying a brightness of the reflected light of external light by the external-light brightness specifying bar 30. As a method of setting the values of the external-light color temperature specifying bar 35 and external-light brightness specifying bar 30, the viewer operates, for example, a "+" key or "−" key of a remote controller. The external-light color temperature specifying bar 35 and external light brightness specifying bar 30 inform the viewer of the set value by a change in the display color or display brightness. In the example of FIG. 25, the specified color temperature of the external light and the specified brightness of the reflected light of external light are "5500K" and "3", respectively.

The black-display characteristic specifying means 5F generates a black-display characteristic specifying data BD6 from the values of the external-light color temperature specifying bar 35 and the external-light brightness specifying bar 30, which have been specified by the viewer. For example, the sum of a 100 times value of the external-light color temperature and the value of the external light-brightness specifying bar 30, each being specified by the viewer, can be employed as a black-display characteristic specifying data BD6. Thus in the example of FIG. 25, the black-display characteristic specifying means 5F outputs "550003" as a black-display characteristic specifying data BD6, to the black-approximated data calculating means 4F.

The black-approximated data calculating means 4F receives the black-display characteristic specifying data BD6 from the black-display characteristic specifying means 5F, and calculates and outputs black-corrected image data.

FIG. 26 is an explanatory diagram illustrating a flow of a calculation processing of black-approximated data R3, G3 and B3 in the black-approximated data calculating means 4F. Referring to FIG. 26, description will be made of a calculation processing of black-approximated data R3, G3 and B3 in the black-approximated data calculating means 4F.

Firstly, in step S61, by using a reflected-light brightness data BD61, set with the external-light brightness specifying bar 30, in the black-display characteristic specifying data BD6, a specified value Ye of the reflected light of external light on the image display means 3 is calculated based on a predetermined reference. The calculation of the specified value Ye can be performed in the same manner as the processing of step S11 in the first preferred embodiment shown in FIG. 3.

In step S62, in parallel with the processing of step S61, a ratio Xe:Ye:Ze of the tristimulus values of the reflected light of external light is selected based on an external-light color temperature data BD62, set with the external-light color temperature specifying bar 35, in the black-display characteristic specifying data BD6.

The black-approximated data calculating means 4F holds a ratio of tristimulus values of the external light reflected from the image display means 3, as a table to the color temperature of external light. The calculating means 4F can output an appropriate ratio of tristimulus values by using the external-light color temperature data BD62 of the reflected light of external light.

In step S63, by using the specified value Ye and the ratio Xe:Ye:Ze of the tristimulus values selected in step S62, Xe, Ye and Ze which the viewer specifies with respect to the tristimulus values of the external light reflected from the image display means 3, are calculated in the same manner as the processing of step S12 in the first preferred embodiment shown in FIG. 3.

In step S64, black-approximated data R3, G3 and B3 are calculated from the specified values Xe, Ye and Ze of the tristimulus values of a reflected light of external light in the image display means 3, in the same manner as the processing of step S13 in he first preferred embodiment shown in FIG. 3.

With the image display device of the eighth preferred embodiment, since the viewer specifies a black-display characteristic with the color temperature of an external light and the brightness of a reflected light of the external light, the viewer can select a suitable color temperature of the external light according to the environment in which the image display device is used. Therefore, as compared to the case of specifying a black-display characteristic by the kind of a reflected light of external light and the brightness of the external light, described in the seventh preferred embodiment, the degree of freedom is more increased to permit a further increase in the accuracy of correction of the influence of external light.

Additionally, in the recent image display devices, a color temperature is usually employed in specifying a white balance, and it is easier for the viewer familiar with image display devices to specify a black-display characteristic by using a single color temperature, than the case of separately adjusting a color data of RGB.

Ninth Preferred Embodiment

In the eighth preferred embodiment, the menu of the black-display characteristic specifying means 5F is configured such that a viewer specifies a black-display characteristic by a color temperature of an external light and a brightness of a reflected light of external light. A ninth preferred embodiment is characterized in that the menu of a black-display characteristic specifying means 5G is configured such that a black-display characteristic is specified by using the tristimulus values of a reflected light of external light.

Figure 27:
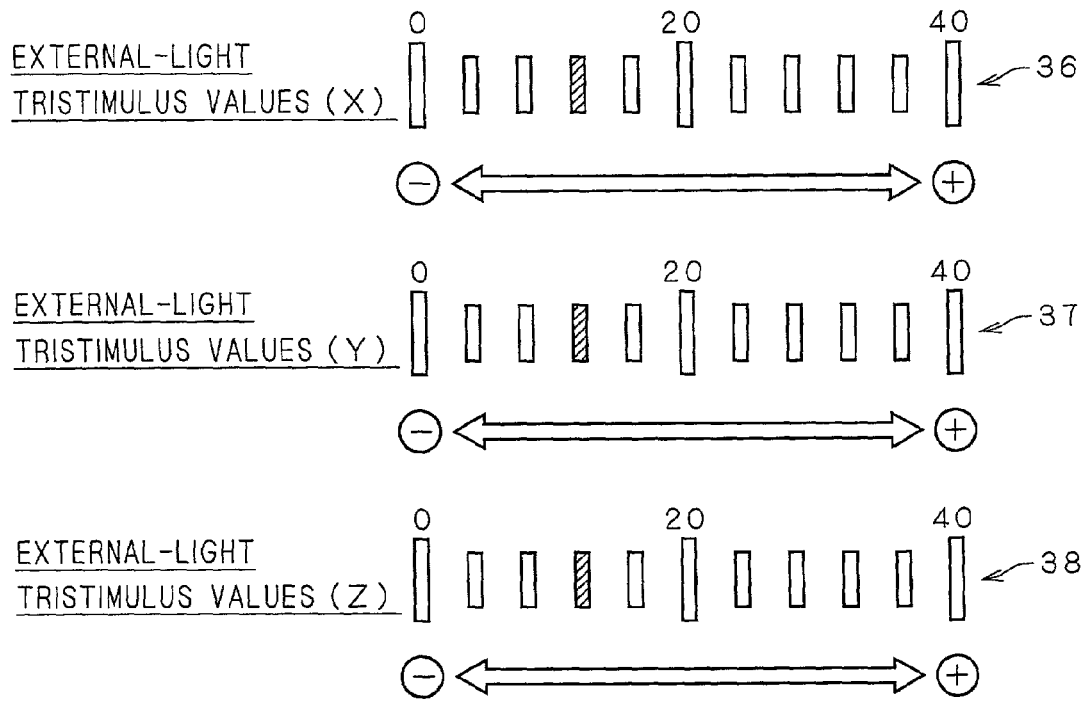
FIG. 27 is an explanatory diagram illustrating a menu of a black-display characteristic specifying means in an image display device according to a ninth preferred embodiment.

FIG. 27 is an explanatory diagram illustrating a menu of the black-display characteristic specifying means 5G to be displayed on a screen of an image display means 3 in an image display device according to the ninth preferred embodiment. Referring to FIG. 27, the tristimulus values of a reflected light of external light can be specified by operating an external light X-value specifying bar 36, an external light Y-value specifying bar 37 and an external light Z-value specifying bar 38. Except for the black-display characteristic specifying means 5G and a black-approximated data calculating means 4G, the configuration of the ninth preferred embodiment is the same as that of the first preferred embodiment.

To set a black-display characteristic specifying data BD7, a viewer specifies the tristimulus values of an external light by operating the external light X-value specifying bar 36, external light Y-value specifying bar 37 and external light Z-value specifying bar 38. As a method of setting the values of the bars 36, 37 and 38, the viewer operates, for example, a "+" key or "−" key of a remote controller. The bars 36, 37 and 38 inform the viewer of the set values by a change in the display color or display brightness. In the example of FIG. 27, the specified tristimulus values of the external light are X=12, Y=12, and Z=12.

The black-display characteristic specifying means 5G generates a black-display characteristic specifying data BD7 from the values of the external light X-value specifying bar 36, external light Y-value specifying bar 37 and external light Z-value specifying bar 38, each being specified by the viewer. For example, the sum of a 10000 times value of the specified X-value, a 100 times value of the specified Y-value, and the specified Z-value can be employed as a black-display characteristic specifying data BD7. Thus in the example of FIG. 27, the black-display characteristic specifying means 5G outputs "121212" as a black-display characteristic specifying data BD7, to the black-approximated data calculating means 4G.

The black-approximated data calculating means 4G receives the black-display characteristic specifying data BD7 from the black-display characteristic specifying means 5G, and calculates and outputs black-corrected image data R3, G3 and B3.

Figure 28:
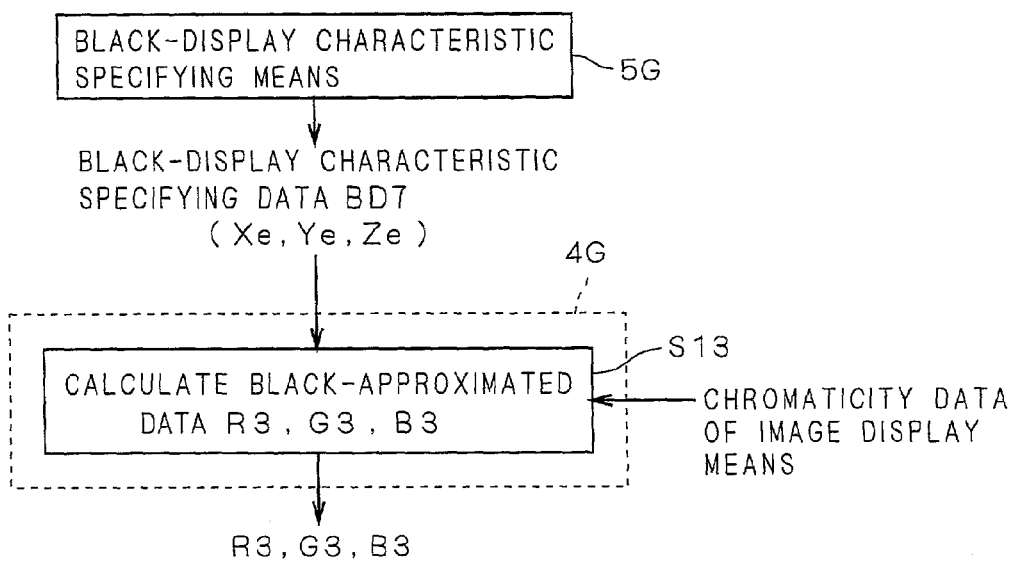
FIG. 28 is an explanatory diagram illustrating a flow of processing of calculating a black-approximated data in a black-approximated data calculating means of the ninth preferred embodiment.
Figure 29:
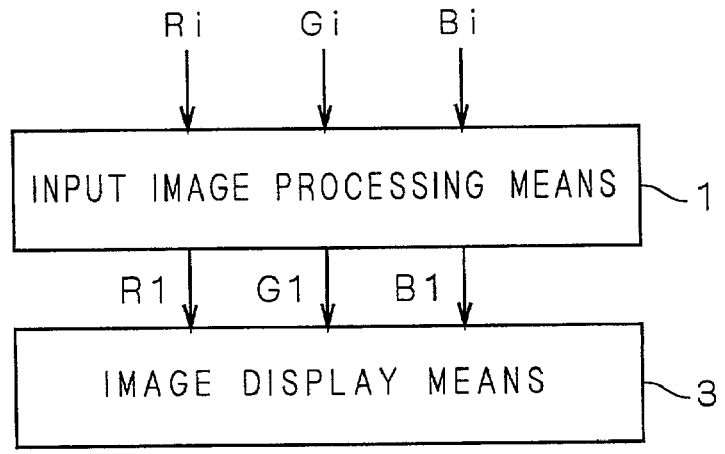
FIG. 29 is a block diagram illustrating a configuration of a conventional image display device.

FIG. 28 is an explanatory diagram illustrating a flow of a calculation processing of black-approximated data R3, G3 and B3 in the black-approximated data calculating means 4G. Referring to FIG. 28, description will be made of a calculation processing of black-approximated data R3, G3 and B3 in the black-approximated data calculating means 4G.

Since in the ninth preferred embodiment, the black-display characteristic specifying data BD7 are Xe, Ye and Ze themselves, which the viewer has specified with respect to the tristimulus values of a reflected light of external light, the processing of calculating Xe, Ye and Ze (i.e., steps S11 and S12 in FIG. 3) is unnecessary.

Therefore, in step S71, in the same manner as the processing of step S13 in the first preferred embodiment shown in FIG. 3, black-approximated data R3, G3 and B3 are calculated from the specified values Xe, Ye and Ze of the tristimulus values of a reflected light of external light in the image display means 3.

With the image display device of the ninth preferred embodiment, since the viewer specifies a black-display characteristic with the tristimulus values of a reflected light of an external light, the viewer can select suitable tristimulus values of an external light according to the environment in which the image display device is used. Therefore, as compared to the case of specifying a black-display characteristic by the color temperature of an external light and the brightness of a reflected light of the external light, the degree of freedom is more increased to permit a further increase in the accuracy of correction of the influence of external light.

Others

Although in the foregoing description the configuration except for the characteristic features inherent in each of the fourth to ninth preferred embodiments is the same as the configuration of the first preferred embodiment, it is of course possible to employ the same configuration as the second or third preferred embodiment.

While the invention has been shown and described in detail, the foregoing description is in all aspects illustrative and not restrictive. It is therefore understood that numerous modifications and variations can be devised without departing from the scope of the invention.

What is claimed is:

1. An image display device, comprising:
   a black correction part performing a black correction processing of correcting a black reproducibility of an image data containing a predetermined number of color data, to output black-corrected image data; and
   an image display means performing an image display on a predetermined screen based solely on said black-corrected image data,
   said black correction part including:
   a black-display characteristic specifying means performing a predetermined operation to specify a black-display characteristic specifying data related to a characteristic in displaying black with said image display means;
   a black-approximated data calculating means calculating a black-approximated data composed of said predetermined number of color data and related to luminance and at least one of chromaticity and tristimulus values in displaying black based on said characteristic in displaying black with said image display means on the basis of said black-display characteristic specifying data; and
   a black-correction processing executing means executing said black correction processing to said image data in units of said predetermined number of color data based on said black-approximated data, to output said black-corrected image data.

2. The image display device according to claim 1, wherein said black-correction processing executing means includes a black correction means performing a subtraction processing of subtracting a subtraction data based on said black-approximated data from said image data in units of said predetermined number of color data, to output said black-corrected image data.

3. The image display device according to claim 2, wherein said subtraction data includes said black-approximated data itself.

4. The image display device, according to claim 3, wherein said black correction means includes:
   a subtraction means subtracting said black-approximated data from said image data in units of said predetermined number of color data, to obtain data after subtraction; and a limiter setting a color data of less than zero in said predetermined number of color data contained in said data after subtraction to zero, to obtain said black-corrected image data.

5. The image display device according to claim 2, wherein said black correction means includes:
a subtraction data calculating means calculating said black-approximated data itself as said subtraction data when said image data is larger than a predetermined value; and
a subtraction means subtracting said subtraction data from said image data in units of said predetermined number of color data, to obtain data after subtraction, and outputting said data after subtraction as said black-corrected image data.

6. The image display device according to claim 5, wherein said subtraction data calculating means includes a subtraction data calculating means multiplying said black-approximated data with a multiplication factor of less than "1", when said image data is less than said predetermined value, to obtain said subtraction data.

7. The image display device according to claim 1, wherein said black-correction processing executing means includes:
a look-up table storing a table data; and
a table data writing means, writing data in the form of a table capable of deriving one of said black-corrected image data from said image data as said table data, into said look-up table based on said black-approximated data,
said look-up table obtains said black-corrected image data based on said image data by referring to said table data.

8. The image display device according to claim 1, wherein said black-display characteristic specifying data includes data indicating a characteristic of a reflected light of external light on the surface of said predetermined screen of said image display means.

9. The image display device according to claim 8, wherein said black-approximated data calculating means includes a black-approximated data calculating means obtaining a specified value of luminance of a reflected light of external light based on said black-display characteristic specifying data, and calculating said black-approximated data such that a difference between the luminance of the color displayed on said image display means based on said black-approximated data and the luminance in displaying black with said image display means is equal to said specified value.

10. The image display device according to claim 8, wherein said black-approximated data calculating means includes a black-approximated data calculating means obtaining specified values of tristimulus values of a reflected light of external light based on said black-display characteristic specifying data, and calculating said black-approximated data such that a difference between the tristimulus values of the color displayed on said image display means based on said black-approximated data and the tristimulus values in displaying black with said image display means is equal to said specified values.

11. The image display device according to claim 8, wherein:
said characteristic of a reflected light of external light includes a brightness of the reflected light of external light, and
said black-approximated data calculating means includes a black-approximated data calculating means calculating said black-approximated data based on said black-display characteristic specifying data by referring to a chromaticity data indicating a ratio of tristimulus values of a reflected light of external light and a correlation between a color data and tristimulus values in said image display means.

12. The image display device according to claim 11, wherein:
said black-display characteristic specifying data further includes data indicating the kind of an external light, and
said black-approximated data calculating means includes a black-approximated data calculating means calculating said black-approximated data based on said black-display characteristic specifying data by referring to a ratio of tristimulus values of a reflected light of an external light of the kind specified by said black-display characteristic specifying data, and said chromaticity data.

13. The image display device according to claim 11, wherein:
said black-display characteristic specifying data further includes data indicating a color temperature of a reflected light of external light, and
said black-approximated data calculating means includes a black-approximated data calculating means calculating said black-approximated data based on said black-display characteristic specifying data by referring to a ratio of tristimulus values of the reflected light suited for said color temperature indicated by said black-display characteristic specifying data, and said chromaticity data.

14. The image display device according to claim 8, wherein:
said characteristic of the reflected light of external light includes a luminance of the reflected light of external light, and
said black-approximated data calculating means includes a black-approximated data calculating means calculating said black-approximated data based on said black-display characteristic specifying data by referring to a ratio of tristimulus values of a reflected light of external light, and a chromaticity data indicating a correlation between a color data and tristimulus values in said image display means.

15. The image display device according to claim 8, wherein:
said characteristic of the reflected light of external light includes tristimulus values of the reflected light of external light, and
said black-approximated data calculating means includes a black approximated data calculating means calculating said black-approximated data based on said black-display characteristic specifying data, by referring to a chromaticity data indicating a correlation between a color data and tristimulus values in said image display means.

16. The image display device according to claim 1, wherein said black-display characteristic specifying data includes data indicating a characteristic in displaying black with said image display means.

17. The image display device according to claim 16, wherein said black-approximated data calculating means includes a black-approximated data calculating means obtaining a specified value of luminance in displaying black based on said black-display characteristic specifying data, and calculating said black-approximated data such that a difference between the luminance of the color displayed on said image display means based on said black-approximated data and the luminance in displaying black with said image display means is equal to said specified value.

18. The image display device according to claim 16, wherein said black-approximated data calculating means includes a black-approximated data calculating means obtaining specified values of tristimulus values in displaying black based on said black-display characteristic specifying data, and calculating said black-approximated data such that a difference between the tristimulus values of the color displayed on said image display means based on said black-approximated data and the tristimulus values in displaying black with said image display means is equal to said specified values.

19. The image display device according to claim 16, wherein:
said characteristic in displaying black includes a brightness in displaying black, and
said black-approximated data calculating means includes a black-approximated data calculating means calculating said black-approximated data based on said black-display characteristic specifying data by referring to tristimulus values in displaying black in the absence of external light, a ratio of tristimulus values of a reflected light of external light, and a chromaticity data indicating a correlation between a color data and tristimulus values in said image display means.

20. The image display device according to claim 16, wherein:
said characteristic in displaying black includes a luminance in displaying black, and
said black-approximated data calculating means includes a black-approximated data calculating means calculating said black-approximated data based on said black-display characteristic specifying data by referring to tristimulus values in displaying black in the absence of external light, a ratio of tristimulus values of a reflected light of external light, and a chromaticity data indicating a correlation between a color data and tristimulus values in said image display means.

21. A method to perform black-correction of an image data for display to an image display device, comprising the steps of:
performing a black correction processing of correcting a black reproducibility of an image data containing a predetermined number of color data, to output black-corrected image data; and
performing an image display on a predetermined screen based solely on said black-corrected image data,
the step of performing the black correction processing including the step of
performing a predetermined operation to specify a black-display characteristic specifying data related to a characteristic in displaying black with the step of performing an image display;
calculating a black-approximated data composed of said predetermined number of color data and related to luminance and at least one of chromaticity and tristimulus values in displaying black based on said characteristic in displaying black with the step of performing an image display on the basis of said black-display characteristic specifying data; and
executing said black correction processing to said image data in units of said predetermined number of color data based on said black-approximated data, to output said black-corrected image data.

22. The method according to claim 21, wherein the step of executing said black correction processing includes subtracting a subtraction data based on said black-approximated data from said image data to output said black-corrected image data.

23. The method according to claim 22, wherein said subtraction data includes said black-approximated data itself.

24. The method according to claim 23, wherein said step of executing said black correction processing further includes:
subtracting said black-approximated data from said image data in units of said predetermined number of color data, to obtain data after subtraction; and
setting a color data of less than zero in said predetermined number of color data contained in said data after subtraction to zero, to obtain said black-corrected image data.

25. The method according to claim 22, wherein said step of executing said black correction processing further includes:
calculating said black-approximated data itself as said subtraction data when said image data is larger than a predetermined value; and
subtracting said subtraction data from said image data in units of said predetermined number of color data, to obtain data after subtraction, and outputting said data after subtraction as said black-corrected image data.

26. The method according to claim 25, wherein said step of calculating said black-approximated data includes multiplying said black-approximated data with a multiplication factor of less than "1", when said image data is less than said predetermined value, to obtain said subtraction data.

27. The method according to claim 21, wherein said step of executing said black correction processing includes:
writing data in a form of a table capable of deriving one of said black corrected image data from said image data as a table data, into a look-up table based on said black-approximated data; and
obtaining said black-corrected image data based on said image data by referring to said table data.

28. The method according to claim 21, further comprising specifying said black-display characteristic specifying data related to displaying black on said image display device, wherein said black-display characteristic specifying data includes data indicating a characteristic of a reflected light of external light on the surface of said image display device.

29. The method according to claim 28, wherein said step of calculating said black-approximated data includes:
obtaining a specified value of luminance of a reflected light of external light based on said black-display characteristic specifying data; and
calculating said black-approximated data such that a difference between the luminance of the color displayed on said image display device based on said black-approximated data and the luminance in displaying black with said image display device is equal to said specified value.

30. The method according to claim 28, wherein said step of calculating said black-approximated data includes:
obtaining specified values of tristimulus values of a reflected light of external light based on said black-display characteristic specifying data; and
calculating said black-approximated data such that a difference between the tristimulus values of the color displayed on said image display device based on said black-approximated data and the tristimulus values in displaying black with said image display device is equal to said specified values.

31. The method according to claim 28, wherein:

said characteristic of a reflected light of external light includes a brightness of the reflected light of external light, and said step of calculating said black-approximated data includes calculating said black-approximated data based on said black-display characteristic specifying data by referring to a chromaticity data indicating a ratio of tristimulus values of a reflected light of external light and a correlation between a color data and tristimulus values in said image display device.

32. The method according to claim 31, wherein:

said black-display characteristic specifying data further includes data indicating the kind of an external light, and said step of calculating said black-approximated data further includes calculating said black-approximated data based on said black-display characteristic specifying data by referring to a ratio of tristimulus values of a reflected light of an external light of the kind specified by said black-display characteristic specifying data, and said chromaticity data.

33. The method according to claim 31, wherein:

said black-display characteristic specifying data further includes data indicating a color temperature of a reflected light of externai light, and said step of calculating said black-approximated data further includes calculating said black-approximated data based on said black-display characteristic specifying data by referring to a ratio of tristimulus values of the reflected light suited for said color temperature indicated by said black-display characteristic specifying data, and said chromaticity data.

34. The method according to claim 28, wherein:

said characteristic of the reflected light of external light includes a luminance of the reflected light of external light, and said step of calculating said black-approximated data includes calculating said black-approximated data based on said black-display characteristic specifying data by referring to a ratio of tristimulus values of a reflected light of external light, and a chromaticity data indicating a correlation between a color data and tristimulus values in said image display device.

35. The method according to claim 28, wherein:

said characteristic of the reflected light of external light includes tristimulus values of the reflected light of external light, and said step of calculating said black-approximated data includes calculating said black-approximated data based on said black-display characteristic specifying data, by referring to a chromaticity data indicating a correlation between a color data and tristimulus values in said image display device.

36. The method according to claim 21, wherein said black-display characteristic specifying data includes data indicating a characteristic in displaying black with said image display device.

37. The method according to claim 36, wherein said step of calculating said black-approximated data includes:

obtaining a specified value of luminance in displaying black based on said black-display characteristic specifying data; and calculating said black-approximated data such that a difference between the luminance of the color displayed on said image display device based on said black-approximated data and the luminance in displaying black with said image display device is equal to said specified value.

38. The method according to claim 36, wherein said step of calculating said black-approximated data further includes:

obtaining specified values of tristimulus values in displaying black based on said black-display characteristic specifying data; and calculating said black-approximated data such that a difference between the tristimulus values of the color displayed on said image display device based on said black-approximated data and the tristimulus values in displaying black with said image display device is equal to said specified values.

39. The method according to claim 36, wherein:

said characteristic in displaying black includes a brightness in displaying black, and said step of calculating said black-approximated data includes calculating said black-approximated data based on said black-display characteristic specifying data by referring to tristimulus values in displaying black in the absence of external light, a ratio of tristimulus values of a reflected light of external light, and a chromaticity data indicating a correlation between a color data and tristimulus values in said image display device.

40. The method according to claim 36, wherein:

said characteristic in displaying black includes a luminance in displaying black, and said step of calculating said black-approximated data includes calculating said black-approximated data based on said black-display characteristic specifying data by referring to tristimulus values in displaying black in the absence of external light, a ratio of tristimulus values of a reflected light of external light, and a chromaticity data indicating a correlation between a color data and tristimulus values in said image display device.

41. An image display device, comprising:

a black correction part performing a black correction processing of correcting a black reproducibility of an image data containing a predetermined number of color data, to output black-corrected image data; and an image display means performing an image display on a predetermined screen based solely on said black-corrected image data, said black correction part including:

a black-display characteristic specifying means performing a predetermined operation to specify a black-display characteristic specifying data related to a characteristic in displaying black with said image display means the characteristic being based on data input from an image display user;

a black-approximated data calculating means calculating a black-approximated data composed of said predetermined number of color data and related to the data input from the image display user and at least one of luminance, chromaticity and tristimulus values in displaying black based on said characteristic in displaying black with said image display means on the basis of said black-display characteristic specifying data; and a black-correction processing executing means executing said black correction processing to said image data in units of said predetermined number of color data based on said black-approximated data, to output said black-corrected image data.

42. An image display device, comprising:

a black correction part performing a black correction processing of correcting a black reproducibility of an image data containing a predetermined number of color data, to output black-corrected image data; and an image display means performing an image display on a predetermined screen based solely on said black-corrected image data, said black correction part including:

a black-display characteristic specifying means performing a predetermined operation to specify a black-display characteristic specifying data related to a characteristic in displaying black with said image display means;

a black-approximated data calculating means calculating a black-approximated data composed of said predetermined number of color data for generating a virtual increment of emission in the image display device and related to at least one of luminance, chromaticity and tristimulus values in displaying black based on said characteristic in displaying black with said image display means on the basis of said black-display characteristic specifying data; and a black-correction processing executing means executing said black correction processing to said image data in units of said predetermined number of color data based on said black-approximated data, to output said black-corrected image data.

* * * * *